US012563330B2

(12) United States Patent
Tseng et al.

(10) Patent No.: US 12,563,330 B2
(45) Date of Patent: Feb. 24, 2026

(54) ELECTRONIC DEVICE

(71) Applicant: Advanced Semiconductor Engineering, Inc., Kaohsiung (TW)

(72) Inventors: Kuei-Hao Tseng, New Taipei (TW); Kai Hung Wang, Taipei (TW); Chih Lung Lin, Taipei (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 215 days.

(21) Appl. No.: 18/240,324

(22) Filed: Aug. 30, 2023

(65) Prior Publication Data

US 2025/0080894 A1 Mar. 6, 2025

(51) Int. Cl.

| | |
|---|---|
| ***H04R 1/00*** | (2006.01) |
| ***H04R 1/02*** | (2006.01) |
| ***H04R 1/10*** | (2006.01) |

(52) U.S. Cl.

CPC ........... *H04R 1/1008* (2013.01); *H04R 1/023* (2013.01); *H04R 1/1041* (2013.01); *H04R 1/1075* (2013.01)

(58) Field of Classification Search

CPC .... H04R 1/1008; H04R 1/023; H04R 1/1041; H04R 1/1075

See application file for complete search history.

(56) References Cited

U.S. PATENT DOCUMENTS

| | | | | |
|---|---|---|---|---|
| 11,792,575 B1 * | 10/2023 | Chen | H04R 9/045 | 381/396 |
| 2013/0083496 A1 * | 4/2013 | Franklin | H01M 50/293 | 361/752 |
| 2016/0029117 A1 * | 1/2016 | Suvanto | H04R 1/326 | 381/337 |

FOREIGN PATENT DOCUMENTS

| | | |
|---|---|---|
| CN | 204993110 U | 1/2016 |
| CN | 111314820 A | 6/2020 |
| CN | 112272343 B | 2/2023 |

* cited by examiner

*Primary Examiner* — Rasha S Al Aubaidi

(74) *Attorney, Agent, or Firm* — FOLEY & LARDNER LLP

(57) ABSTRACT

The present disclosure provides an electronic device. The electronic device includes a flexible element having a channel, a first cover at least covering the channel, and a transducing element connected with the flexible element. The transducing element is configured to convert energy from one form to another to deform and affect the flexible element to adjust a dimension of the first cover.

20 Claims, 20 Drawing Sheets

ELECTRONIC DEVICE

BACKGROUND

1. Technical Field

The present disclosure relates to an electronic device.

2. Description of the Related Art

An electronic device may include a cover (such as a mesh cover) provided on or within an acoustic channel to substantially prevent foreign matter from entering the acoustic channel. In order to improve the acoustic performance of the electronic device, the characteristics or properties of the cover may be adjusted and determined when the electronic device is produced. The cover cannot be adjusted after the electronic device is manufactured.

SUMMARY

In some arrangements, an electronic device includes a flexible element having a channel, a first cover at least covering the channel, and a transducing element connected with the flexible element. The transducing element is configured to convert energy from one form to another to deform and affect the flexible element to adjust a dimension of the first cover.

In some arrangements, an electronic device includes a flexible element having an acoustic channel and an acoustically transmissive cover at least partially covering the acoustic channel. The acoustically transmissive cover is configured to adjust a dimension of a channel between the acoustic channel and outside of the flexible element.

In some arrangements, an electronic device includes a flexible element having an acoustic channel and a transducing element configured to change a size, a shape, or both of the flexible element to adjust an acoustic signal transmitted through the acoustic channel.

BRIEF DESCRIPTION OF THE DRAWINGS

Aspects of some arrangements of the present disclosure are best understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1:
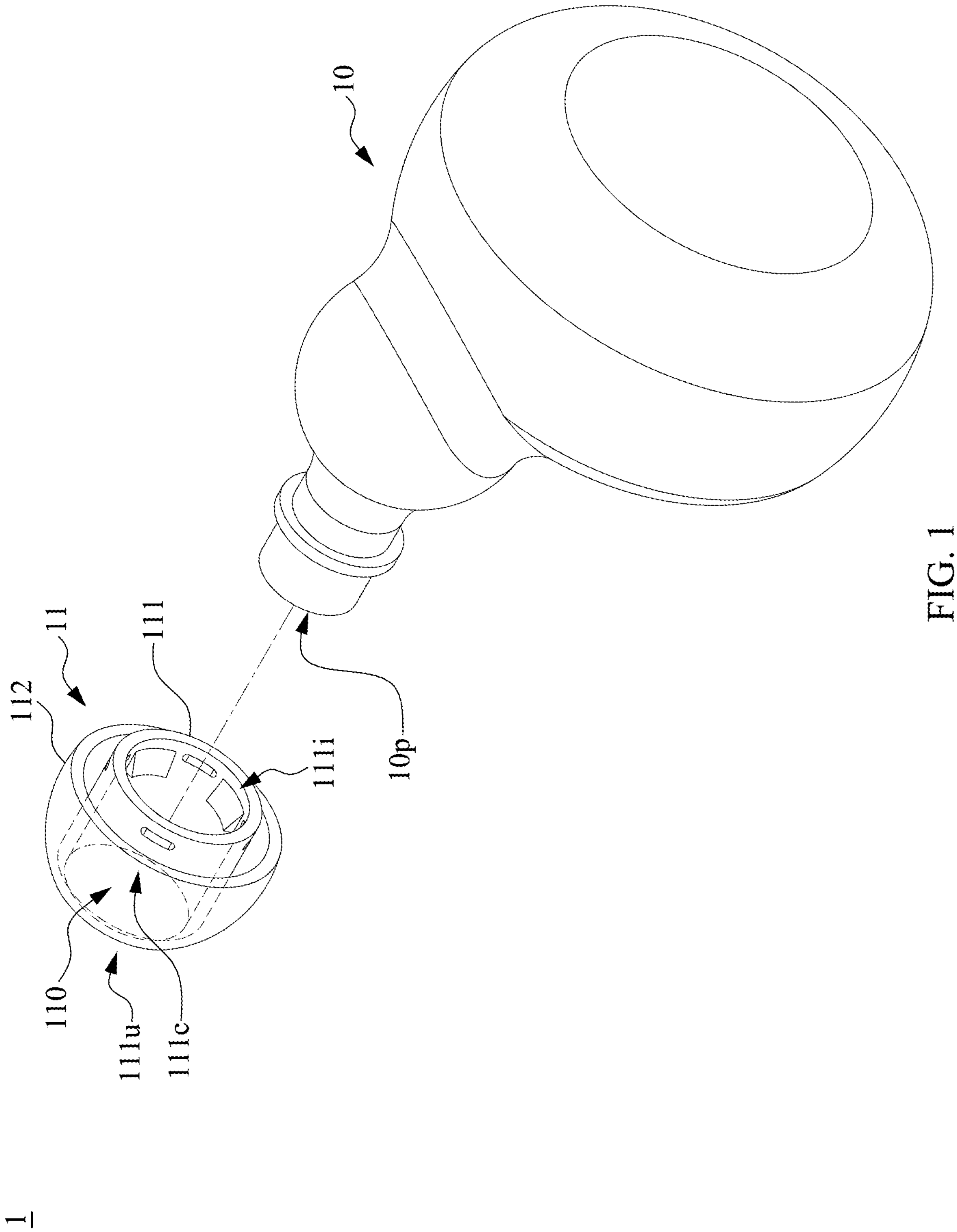
FIG. 1 illustrates a perspective view of an electronic device in accordance with some arrangements of the present disclosure.

The following disclosure provides for many different arrangements, or examples, for implementing different features of the provided subject matter. Specific examples of components and arrangements are described as follows to explain certain aspects of the present disclosure.

These are, of course, merely examples and are not intended to be limiting. For example, the formation of a first feature over or on a second feature in the description that follows may include an arrangement in which the first and second features are formed or disposed in direct contact, and may also include an arrangement in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various arrangements and/or configurations discussed.

Spatial descriptions, such as “above,” “below,” “up,” “left,” “right,” “down,” “top,” “bottom,” “vertical,” “horizontal,” “side,” “higher,” “lower,” “upper,” “over,” “under,” and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of an arrangement of this disclosure are not deviated from by such arrangement.

The following description involves an electronic device and a wearable device.

FIG. 1 illustrates a perspective view of an electronic device 1 in accordance with some arrangements of the present disclosure. The electronic device 1 may include an acoustic device for amplifying, outputting, or transmitting audio signals (or sound waves), a wearable device, and/or a wearable acoustic device. The electronic device 1 may be configured to output audio signals to and/or input audio signals from a user. The electronic device 1 may be configured to output audio signals to and/or input audio signals from the surrounding environment.

The electronic device 1 may include one of a pair of electronic devices configured to fit in the left and right ears of a user. The electronic devices may include a hearing device, a hearing aid, a hearing protection device, an earpiece, an earbud, or a device that may occlude the user's ear canal.

The electronic device 1 may include a housing 10 and an ear tip 11 that may attach to the housing 10. The housing 10 may enclose electronic components that operate the electronic device 1 (e.g., a battery, a processor, a memory, an acoustic driver or source for generating audio signals, etc.). The housing 10 may include an opening 10*p* through which the generated audio signals can be outputted to the ear tip 11, which can then direct the audio signals into the user's ear canal. The ear tip 11 may include an attachment structure or mechanism that enables the ear tip 11 to be attached to the housing 10 or be removed from the housing 10.

The ear tip 11 may include a first portion (such as a body portion 111) and a second portion (such as an ear interface portion 112) disposed at least partially about the body portion 111.

The body portion 111 may be configured to removably attach to the housing 10. The body portion 111 may define or have an acoustic channel (which may also be referred to as a channel, an opening or a hole) 111*c* through which audio signals pass. The body portion 111 may include an acoustic input portion (which may also be referred to as an inlet) 111*i* configured to be disposed adjacent to the opening 10*p* of the housing 10. The generated audio signals from the opening 10*p* may be received or input through the acoustic input portion 111*i*. The body portion 111 may include an acoustic output portion (which may also be referred to as an outlet) 111*u* opposite to the acoustic input portion 111*i* and configured to be disposed into a user's ear canal when the electronic device 1 is worn by the user. The body portion 111 may include a cylindrical structure, an elliptic cylindrical structure, or a polygonal column or pillar.

Figure 6:
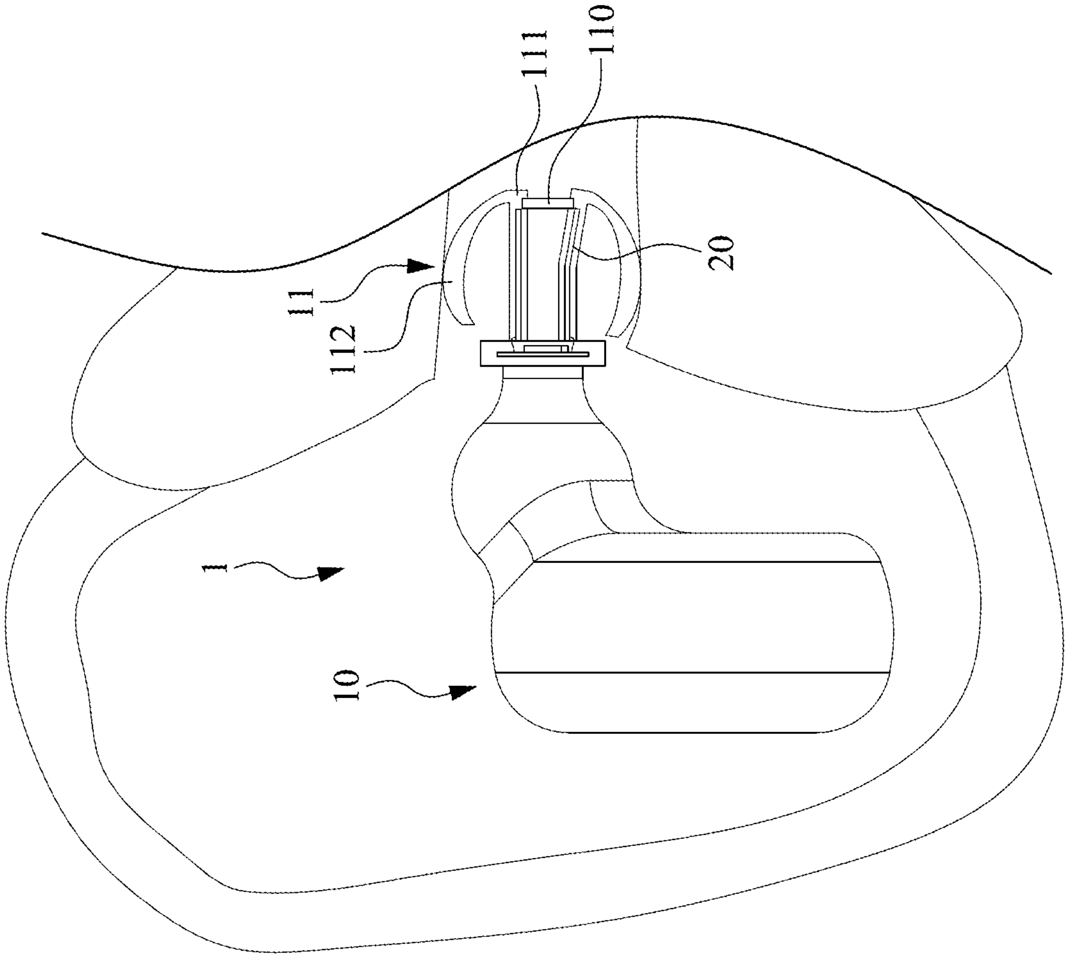
FIG. 6 illustrates a side view of an electronic device being worn on an ear in accordance with some arrangements of the present disclosure.

The ear interface portion 112 may form at least a partial seal with the user's ear canal when the electronic device 1 is worn by the user (as shown in FIG. 6). The ear interface portion 112 may be closer to the user's body (or the user's ear canal) than the body portion 111 when the electronic device 1 is worn by the user. The ear interface portion 112 may be configured as a dome or may include a spherical structure. In other arrangements, the ear interface portion 112 may have other configurations, such as one or more radial fins.

In some arrangements, the body portion 111 and the ear interface portion 112 may be a single, monolithic structure. For example, the body portion 111 and the ear interface portion 112 may constitute an unassembled unitary member that may be formed in a molding or other operation. In some arrangements, the body portion 111 and the ear interface portion 112 may constitute an assembly of separate components. For example, the ear interface portion 112 may be adhered to at least a top end of the body portion 111 or the acoustic output portion 111*u*. The shapes and the configurations of the body portion 111 and the ear interface portion 112 are not intended to limit the present disclosure.

In some arrangements, the body portion 111 and the ear interface portion 112 may each include, for example, rubber, silicon, sponge, or other suitable materials. In some arrangements, the body portion 111 and the ear interface portion 112 may each include a liquid silicone rubber (LSR). The particular material used may depend on one or more factors including a desire for biocompatibility and oleophobic properties among other considerations and use case requirements.

In some arrangements, the body portion 111 and the ear interface portion 112 may each include a deformable element, an adjustable element, an elastic element, a soft element, and/or a flexible element. For example, the body portion 111 and the ear interface portion 112 may each be configured to be adjustable. For example, the body portion 111 and the ear interface portion 112 may each be soft and flexible enough for the user to wear comfortably for an extended time period. In some arrangements, the body portion 111 and the ear interface portion 112 may each be relatively more resistant to stress, impact, twisting or other physical or structural changes. For example, the body portion 111 and the ear interface portion 112 may each be resilient, such that, after being squeezed or deformed, it can return to its original state. In some arrangements, when the electronic device 1 is worn by a user, the ear interface portion 112 may be conformal to the user's ear canal. In some arrangements, the ear interface portion 112 may flexibly adjust its shape to conform to the user's ear canal.

In some arrangements, the body portion 111 and the ear interface portion 112 may include the same material. In some arrangements, the body portion 111 and the ear interface portion 112 may include different materials.

The ear tip 11 may include a cover 110 disposed adjacent to the acoustic output portion 111*u* of the body portion 111. The cover 110 may be acoustically transmissive. In order for the ear tip 11 to provide good quality audio, the acoustic channel 111*c* may remain substantially free of any foreign matter that may collect in the acoustic channel 111*c* by providing the cover 110. The cover 110 may at least covering the acoustic channel 111*c*. The cover 110 may be configured to substantially prevent foreign matter, such as human debris (e.g., ear wax), from entering into the acoustic channel 111*c*.

The cover 110 may include a mesh cover. For example, the cover 110 may include an interlaced structure or a mesh structure that allows the audio signals (or sound waves) or air waves to propagate. For example, the cover 110 may be formed of a network of wires, lines, or yarns. For example, the cover 110 may include a plurality of openings, apertures, holes, patterns, or paths (annotated as 110*h* in the figures). The openings 110*h* may be located between the acoustic channel 111*c* and outside of the ear tip 11 (such as located between the acoustic channel 111*c* and the user's ear canal). In some arrangements, the cover 110 may include textile, fabric, plastic, metal, metal alloy, carbon fiber, silicone, other suitable materials, or composite materials. In some arrangements, the cover 110 may include a multi-layered mesh structure. In some arrangements, from a top view (such as the top view of FIG. 2A), the outline of the cover 110 may be in the shape of a circle, oval, ellipse, square, triangle, polygon, etc. The plurality of openings 110*h* of the cover 110 may be evenly or equally spaced. The plurality of openings 110*h* of the cover 110 may be in the shape of a circle, oval, ellipse, square, triangle, polygon, etc.

Example ear tips are discussed in detail with respect to FIGS. 2A, 2B, 3A, 3B, 3C, 3D, 4A, 4B, 4C, 4D, 5A, 5B, 5C, 5D, 5E, 5F, and 5G. Application or usage of the electronic device 1 in the figures is for illustrative purposes only, and not intended to limit the present disclosure. The teachings of the present disclosure are also applicable to a speaker, a headset, or a headphone (such as the electronic device 7 in FIG. 7 or another over-the-ear device) among other acoustic devices.

Figure 2A:
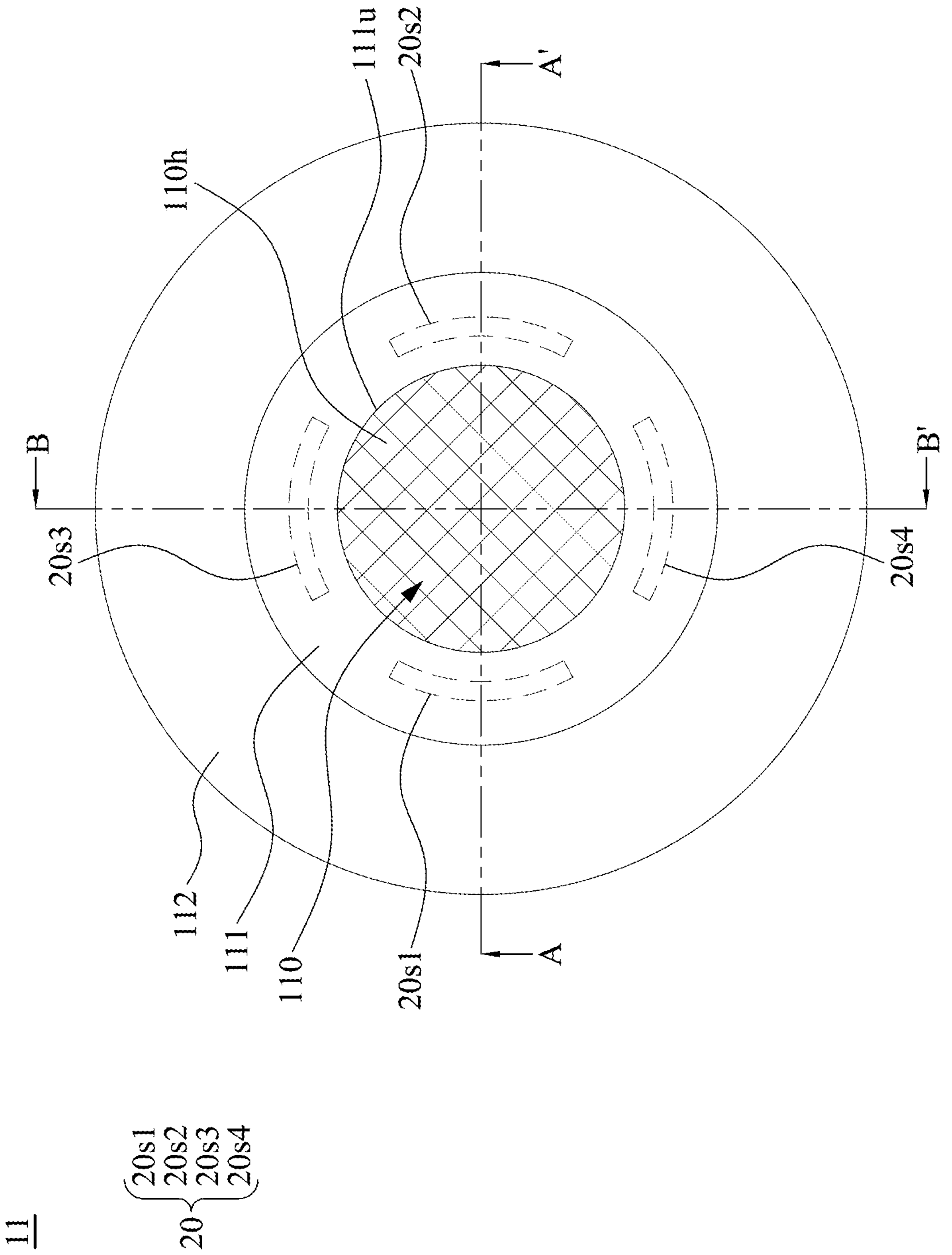
FIG. 2A illustrates a top view of an electronic device in accordance with some arrangements of the present disclosure.

FIG. 2A illustrates a top view of an electronic device in accordance with some arrangements of the present disclosure. In some arrangements, the ear tip 11 of the electronic device 1 in FIG. 1 may have a top view in FIG. 2A.

The ear tip 11 may include a deformable element 20. The deformable element 20 may be encapsulated, covered, embedded, and/or surrounded in the body portion 111. The deformable element 20 may not be exposed from the body portion 111. The dashed lines are illustrated to present a contour of the deformable element 20. The deformable element 20 may surround or be disposed around the cover 110. For example, the cover 110 may be at least partially exposed from the acoustic output portion 111*u*, and the deformable element 20 may be disposed between the cover 110 and the outermost boundary of the body portion 111.

In some arrangements, the deformable element 20 may include a plurality of sections 20*s*1, 20*s*2, 20*s*3, and 20*s*4 collectively surrounding the cover 110. The sections 20*s*1, 20*s*2, 20*s*3, and 20*s*4 of the deformable element 20 are separated from one another.

The sections 20*s*1, 20*s*2, 20*s*3, and 20*s*4 of the deformable element 20 may be symmetrically disposed with respect to a center of the cover 110. The sections 20*s*1, 20*s*2, 20*s*3, and 20*s*4 of the deformable element 20 may be spaced apart from one another by an equivalent distance. The sections 20*s*1, 20*s*2, 20*s*3, and 20*s*4 of the deformable element 20 may have different characteristics or properties (such as widths, materials, types of deformation, orientations of deformation, directions of deformation, degrees of deformation, etc.).

The deformable element 20 may be deformed without experiencing cracking, breaking, or failure. The deformation of the deformable element 20 may include extension, compression, depression, projection, shear, bending, twisting, etc. For example, the size and/or the shape (or the dimension) of the deformable element 20 may be changed from a reference configuration to a current configuration. A configuration is defined as a set containing the positions of all the particles of the deformable element 20. The dimension may be a measurable extent (such as length, breadth, depth, or height), a form, or a shape.

The deformable element 20 may be deformed (e.g., exhibits a change in the size and/or the shape) by an external force (such as tensile, thrust, shear, bending or torsional), changes in an electric field (or a magnetic field or electromagnetic field), changes in temperature, changes in moisture content or chemical reactions, etc. In some arrangements, the deformation of the deformable element 20 may be controlled automatically or manually by a user after the electronic device 1 is manufactured.

In some arrangements, the deformable element 20 may include a transducing element or a transducer that may convert energy from one form to another. In some arrangements, the deformable element 20 may include a piezoelectric material that may exhibit a piezoelectric effect (to convert mechanical energy to electrical energy) and a reverse piezoelectric effect (to convert electrical energy to mechanical energy). For example, the deformable element 20 may be deformed when subjected to or stimulated by an electric field.

In some arrangements, the types, orientations, directions, and degrees of deformation of the deformable element 20 may be controlled by a magnitude and sign of a voltage applied across the deformable element 20.

In some arrangements, when the electronic device 1 is produced, one or more factors may be considered and predetermined to achieve a desired deformation of the deformable element 20 (and thus to achieve a desired acoustic performance). The one or more factors include the different materials of the body portion 111 (further described with respect to FIG. 4A), the different widths of the body portion 111 (further described with respect to FIG. 4B), the different materials of the deformable element 20 (further described with respect to FIG. 4C), and the different widths of the deformable element 20 (further described with respect to FIG. 4D).

Figure 2B:
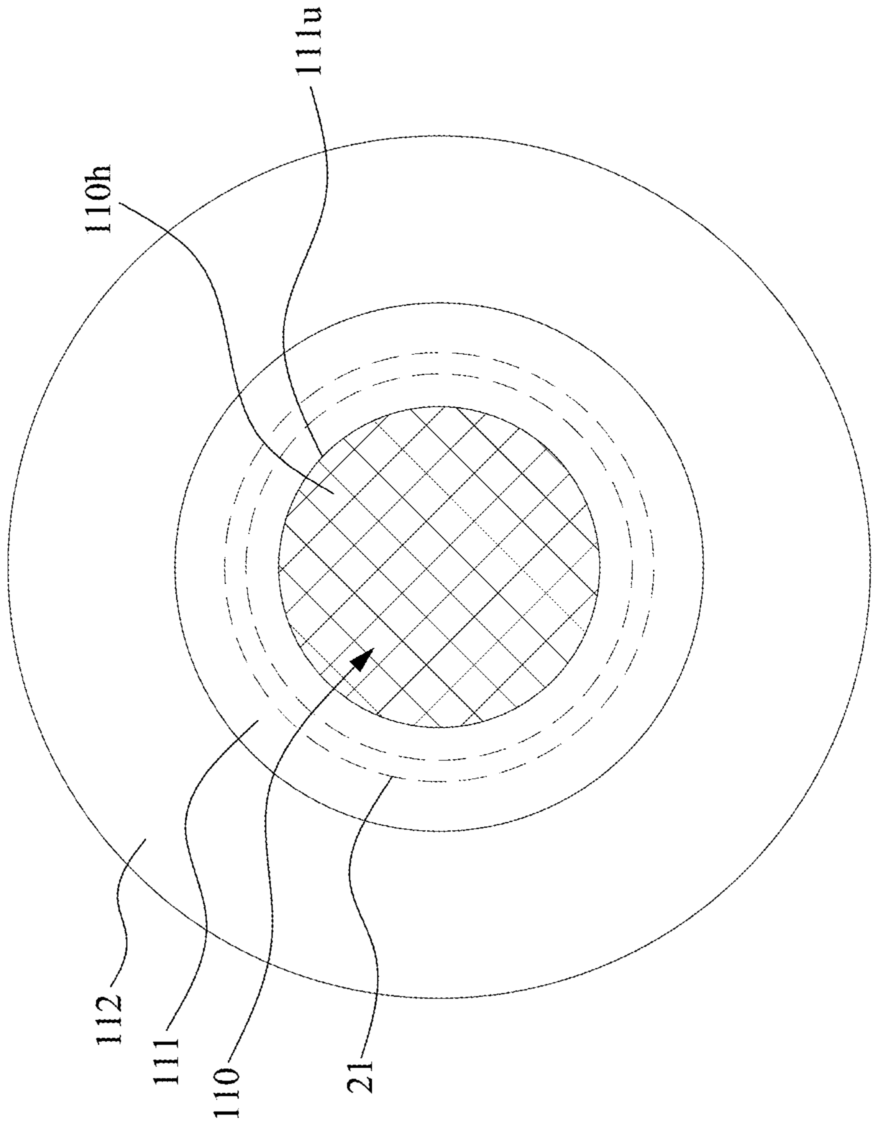
FIG. 2B illustrates a top view of an electronic device in accordance with some arrangements of the present disclosure.

FIG. 2B illustrates a top view of an electronic device in accordance with some arrangements of the present disclosure. In some arrangements, the ear tip 11 of the electronic device 1 in FIG. 1 may have a top view in FIG. 2B. The ear tip 11 in FIG. 2B is similar to the ear tip 11 in FIG. 2A except for the differences described as follows.

The ear tip 11 may include a deformable element 21. The deformable element 21 may include an annular structure. The deformable element 21 may be a single, monolithic structure. The deformable element 21 may be deformed in a geometrically symmetrical manner, and thus allow a geometrically symmetrical deformation of the body portion 111 and/or the cover 110.

Figure 3A:
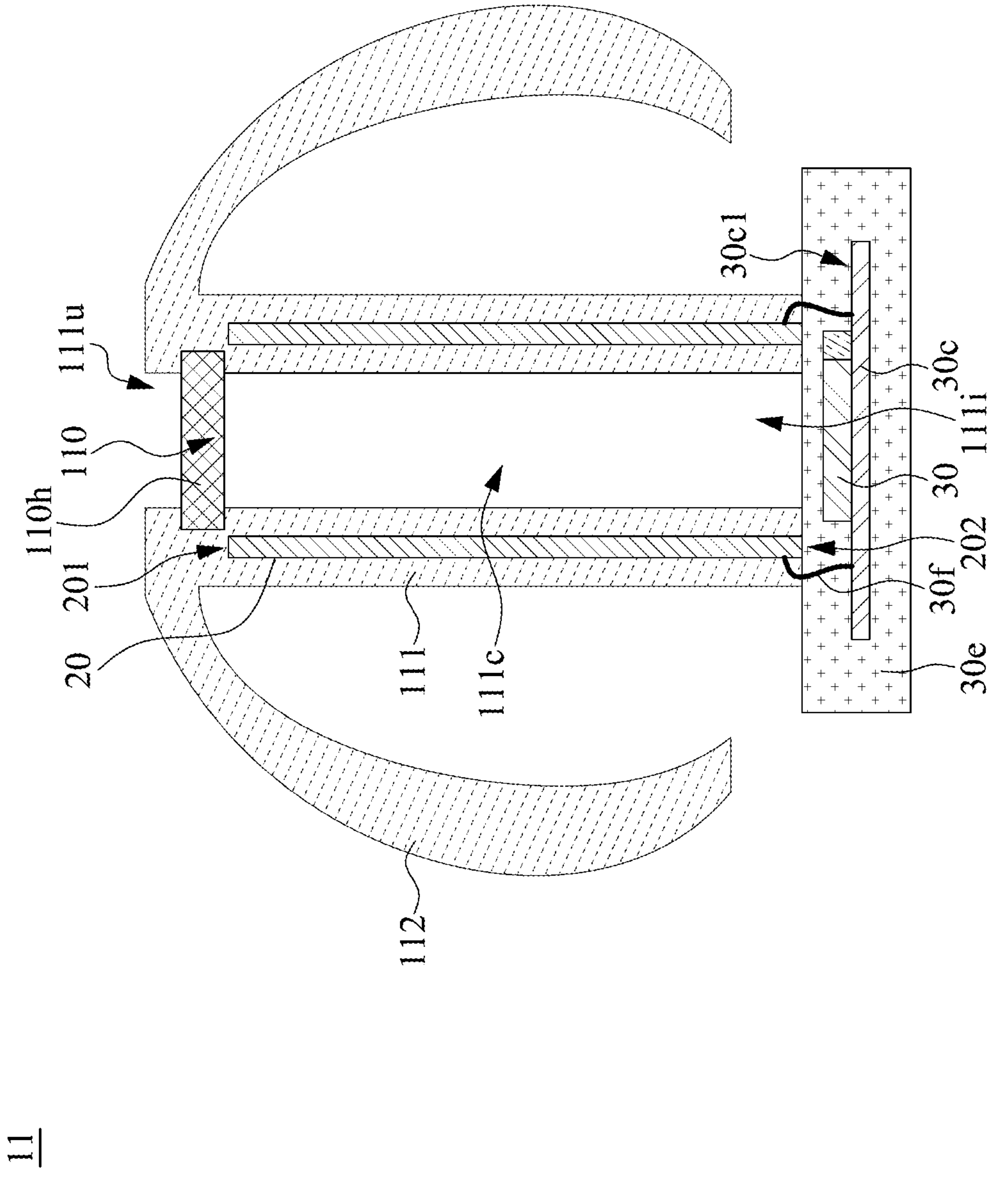
FIG. 3A illustrates a cross-sectional view of an electronic device in accordance with some arrangements of the present disclosure.

FIG. 3A illustrates a cross-sectional view of an electronic device in accordance with some arrangements of the present disclosure. In some arrangements, the ear tip 11 of the electronic device 1 in FIG. 1 may have a cross-sectional view in FIG. 3A. In some arrangements, the cross-sectional view in FIG. 3A may be a cross-sectional view of the ear tip 11 in FIG. 2A along the line AA'.

The ear interface portion 112 may extend from a top end of the body portion 111 or the acoustic output portion 111*u*. The ear interface portion 112 may be at least partially separated from the body portion 111. The space (not annotated in the figures) between the ear interface portion 112 and the body portion 111 may be configured or may be reserved for deformation of the body portion 111 (further described with respect to FIG. 6).

The cover 110 may be disposed across the acoustic channel 111*c* of the body portion 111. The cover 110 may extend into the body portion 111. When the electronic device 1 is worn by a user, the cover 110 may separate the internal space of the acoustic channel 111*c* from the ear canal of the user.

The cover 110 may be snap fit into place or held in place using an adhesive, glue or the like. The cover 110 may stick to the body portion 111 such that the cover 110 may follow the movement of the body portion 111. The cover 110 may stick to the body portion 111 such that when the deformable element 20 is deformed (e.g., exhibits a change in the size and/or the shape), the size and/or the shape of the cover 110

(and the size and/or the shape of the plurality of openings 110*h* thereof) may change along the body portion 111.

The deformable element 20 may extend along the acoustic channel 111*c* of the body portion 111. An end 201 of the deformable element 20 may be closer to the acoustic output portion 111*u* and an end 202 (or an opposite end) of the deformable element 20 may be closer to the acoustic input portion 111*i*. The end 201 of the deformable element 20 may be covered by the body portion 111. In some arrangements, the cover 110 may be closer to the acoustic output portion 111*u* than the end 201 of the deformable element 20 is. For example, the cover 110 may be disposed at an elevation higher than the end 201 of the deformable element 20 with respect to the end 202. The end 202 of the deformable element 20 may be exposed from the body portion 111. In some arrangements, the end 202 of the deformable element 20 may be in contact with an encapsulation layer 30*e*. In some arrangements, the end 202 of the deformable element 20 may be covered by the body portion 111.

In some arrangements, the deformable element 20 may be configured to receive a signal (which may include a controlling signal from an electronic component 30 or an instruction from a user) and deform (e.g., exhibits a change in the size and/or the shape) based on the signal. For example, the deformable element 20 may be configured to deform automatically or manually after being manufactured.

In some arrangements, the deformable element 20 may be configured to deform the body portion 111 and/or the cover 110 based on the signal. For example, the deformable element 20 may be configured to change a size, a shape, or both of the body portion 111 based on the signal. For example, the deformable element 20 may be configured to change a size, a shape, or both of the cover 110 based on the signal. For example, the deformable element 20 may be configured to deform the body portion 111 and/or the cover 110 automatically or manually after being manufactured.

For example, the deformation of the body portion 111 may follow the deformation of the deformable element 20. For example, the size and/or the shape of the body portion 111 may follow the size and/or the shape of the deformable element 20. In some arrangements, the internal space of the acoustic channel 111*c* may change along the body portion 111.

For example, the size and/or the shape of the cover 110 may change along the body portion 111. In addition, the size and/or the shape of the plurality of openings 110*h* of the cover 110 may also change along the body portion 111.

In some arrangements, the ear tip 11 may include a user device to provide a manually-operable control of the deformable element 20. The user device may include any device capable of communicating via a network, such as a home network and/or an access network. The user device may include an interactive interface, such as a graphic user interface (GUI). Examples of the user device may include a mobile phone, a tablet, a personal computer, or another device that may provide an ability to selectively deform the deformable element 20. For example, the user device may provide a plurality of modes for the user to choose from.

In some arrangements, the ear tip 11 may include the electronic component 30. The electronic component 30 may include a system-in-package (SiP). In some arrangements, the electronic component 30 may include a controlling component, a data conversion component, a processing component, a storage component, a transmission component, or a combination thereof. In some arrangements, the electronic component 30 may include an analog-to-digital converter.

In some arrangements, the electronic component 30 may be configured to control or drive the deformation of the deformable element 20. In some arrangements, the electronic component 30 may be configured to control the size and/or the shape of the deformable element 20. In some arrangements, the electronic component 30 may be configured to control the size and/or the shape of the body portion 111 and the internal space of the acoustic channel 111*c* by deforming the deformable element 20. In some arrangements, the electronic component 30 may be configured to control the size and/or the shape of the cover 110 (and the size and/or the shape of the plurality of openings 110*h* thereof) by deforming the deformable element 20.

In some arrangements, the electronic component 30 may be configured to control the deformation of the deformable element 20 automatically. For example, the electronic component 30 may be configured to determine a frequency response in a user's ear canal when the electronic device 1 is worn by the user and use the frequency response to determine whether the desired acoustic performance has been achieved. In some arrangements, the electronic component 30 may be configured to control the deformation of the deformable element 20 based on the determination.

For example, the ear tip 11 may further include an acoustic driver or source for generating an audio signal (or a test sound wave) into the ear canal, and an input transducer configured to detect a reflected sound wave from the ear canal as an indicator of the frequency response. The input transducer may be a microphone, such as an ear canal microphone, in-ear microphone, in-canal microphone, a bone conduction unit, etc.

For example, the electronic component 30 may be configured to provide a controlling signal (such as a voltage) to the deformable element 20 (which may include a piezoelectric material) based on the determination. The types (such as extension, compression, depression, projection, shear, bending, twisting, etc.), orientations, directions, and degrees of deformation of the deformable element 20 may be controlled by a magnitude and sign of the voltage applied across the deformable element 20 from the electronic component 30.

The electronic component 30 may be disposed over a carrier 30*c*. The electronic component 30 may be electrically connected to one or more of other electrical components (if any), to the carrier 30*c*, and to the deformable element 20, and the electrical connections may be attained by way of flip-chip or wire-bond techniques. The carrier 30*c* may be, for example, a flexible printed circuit (FPC) or a printed circuit board, such as a paper-based copper foil laminate, a composite copper foil laminate, or a polymer-impregnated glass-fiber-based copper foil laminate. In some arrangements, the carrier 30*c* may include an interconnection structure, such as a redistribution later (RDL), a grounding layer, and a feeding line. In some arrangements, the carrier 30*c* may include one or more conductive pads (not illustrated in the figures) in proximity to, adjacent to, or embedded in and exposed at a surface 30*c*1 of the carrier 30*c*. The carrier 30*c* may include solder resists (or solder mask) (not illustrated in the figures) on the surface 30*c*1 of the carrier 30*c* to fully expose or to expose at least a portion of the conductive pads for electrical connections.

The electronic component 30 and the carrier 30*c* may be electrically connected to the deformable element 20 by a flexible connection element 30*f*. In some arrangements, the flexible connection element 30*f* may include an electrical connection element, such as an FPC, a conductive wire, a redistribution layer (RDL), or a combination thereof.

The electronic component 30 may be covered by the encapsulation layer 30*e*. The encapsulation layer 30*e* may be disposed over the carrier 30*c* to encapsulate the electronic component 30. The encapsulation layer 30*e* may be disposed over opposite sides of the carrier 30*c*. The encapsulation layer 30*e* may surround edges of the electronic component 30 and may further cover an active surface and/or an inactive surface of the electronic component 30.

The encapsulation layer 30*e* may cover a portion of the flexible connection element 30*f*. The flexible connection element 30*f* may extend through the encapsulation layer 30*e* and the body portion 111 to connect to the deformable element 20. The encapsulation layer 30*e* may include an epoxy resin having fillers, a molding compound (e.g., an epoxy molding compound or another molding compound), a polyimide, a phenolic compound or material, a material with a silicone dispersed therein, or a combination thereof.

In some arrangements, the electronic component 30 may be integrated in the body portion 111 (for example, through an insert molding process) to shorten the flexible connection element 30*f* and to reduce the transmission distance of the controlling signal from the electronic component 30 to the deformable element 20 through the flexible connection element 30*f*. In some arrangements, the electronic component 30 may be integrated in an attachment structure or mechanism that enables the ear tip 11 to be attached to the housing 10 or be removed from the housing 10.

Figure 3B:
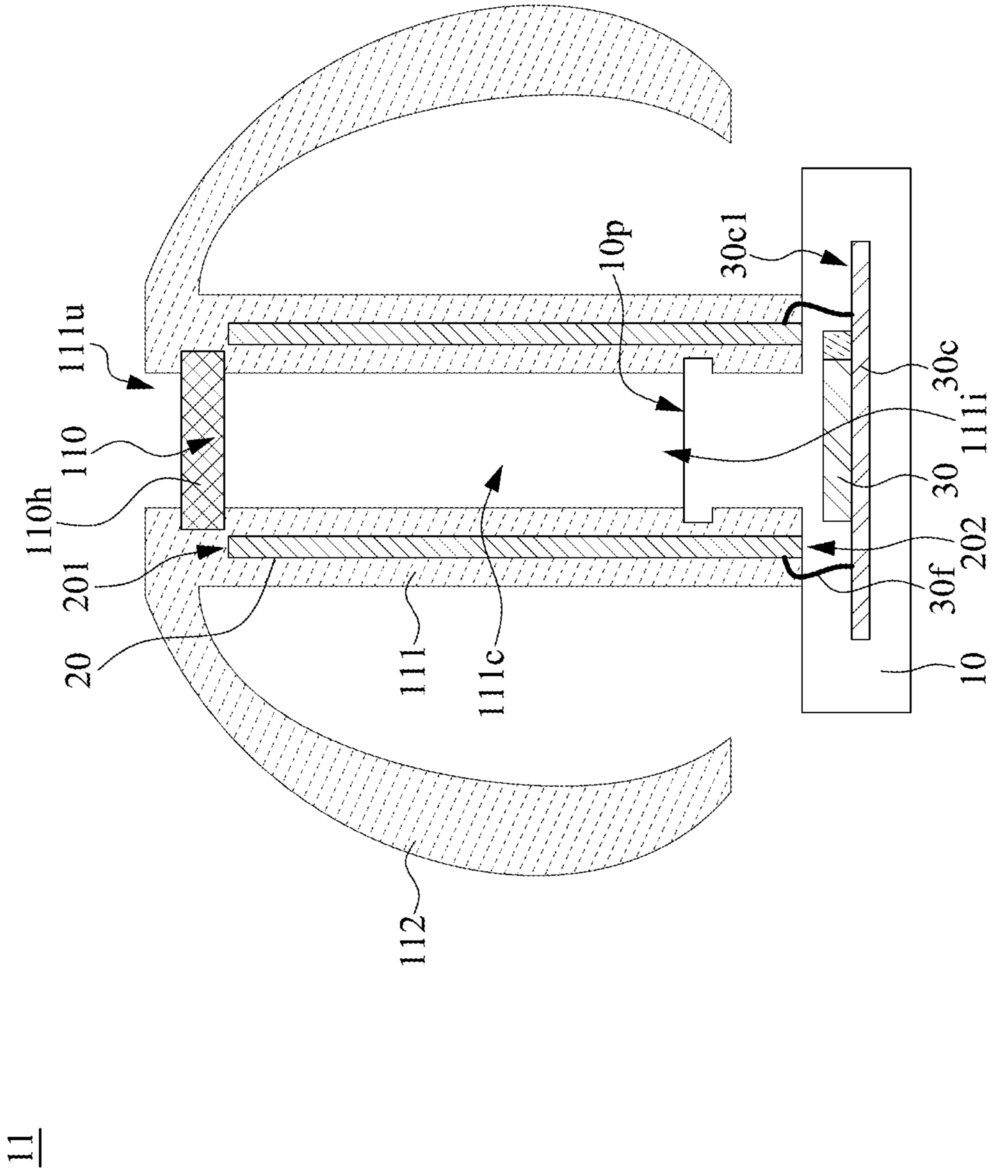
FIG. 3B illustrates a cross-sectional view of an electronic device in accordance with some arrangements of the present disclosure.

FIG. 3B illustrates a cross-sectional view of an electronic device in accordance with some arrangements of the present disclosure. The ear tip 11 in FIG. 3B is similar to the ear tip 11 in FIG. 3A except that the electronic component 30 and the carrier 30*c* may be disposed in the housing 10. The opening 10*p* through which the generated audio signals can be outputted is disposed in the acoustic channel 111*c*. By arranging the electronic component 30 and the carrier 30*c* in the housing 10, the electronic component 30 and the carrier 30*c* can be easily replaced and maintained.

The positions, functions, and number of the electronic component 30 in the electronic device 1 are not intended to limit the present disclosure. For example, there may be any number of electronic components in the electronic device 1 due to design requirements.

Figure 3C:
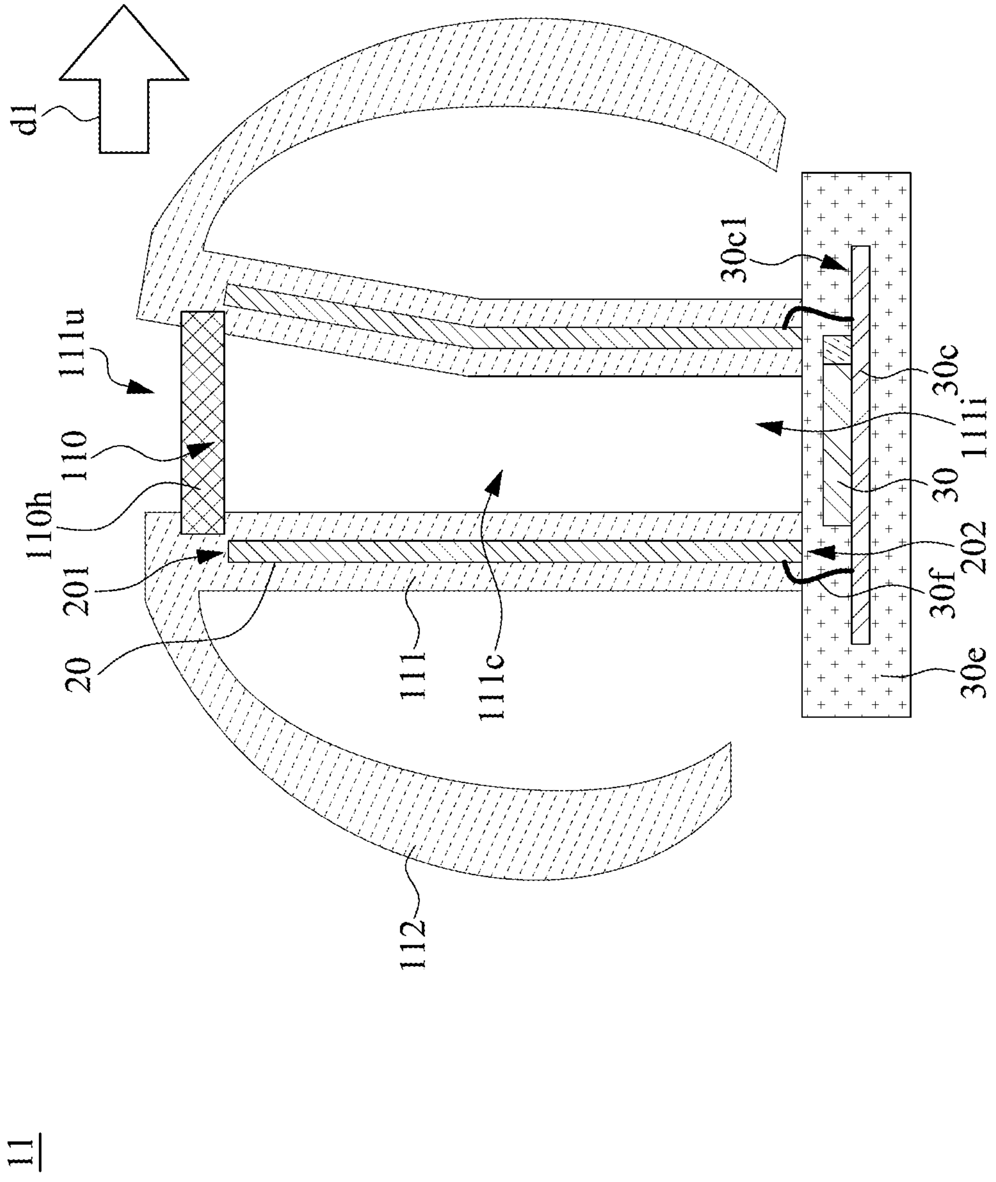
FIG. 3C illustrates a cross-sectional view of an electronic device in accordance with some arrangements of the present disclosure.
Figure 3D:
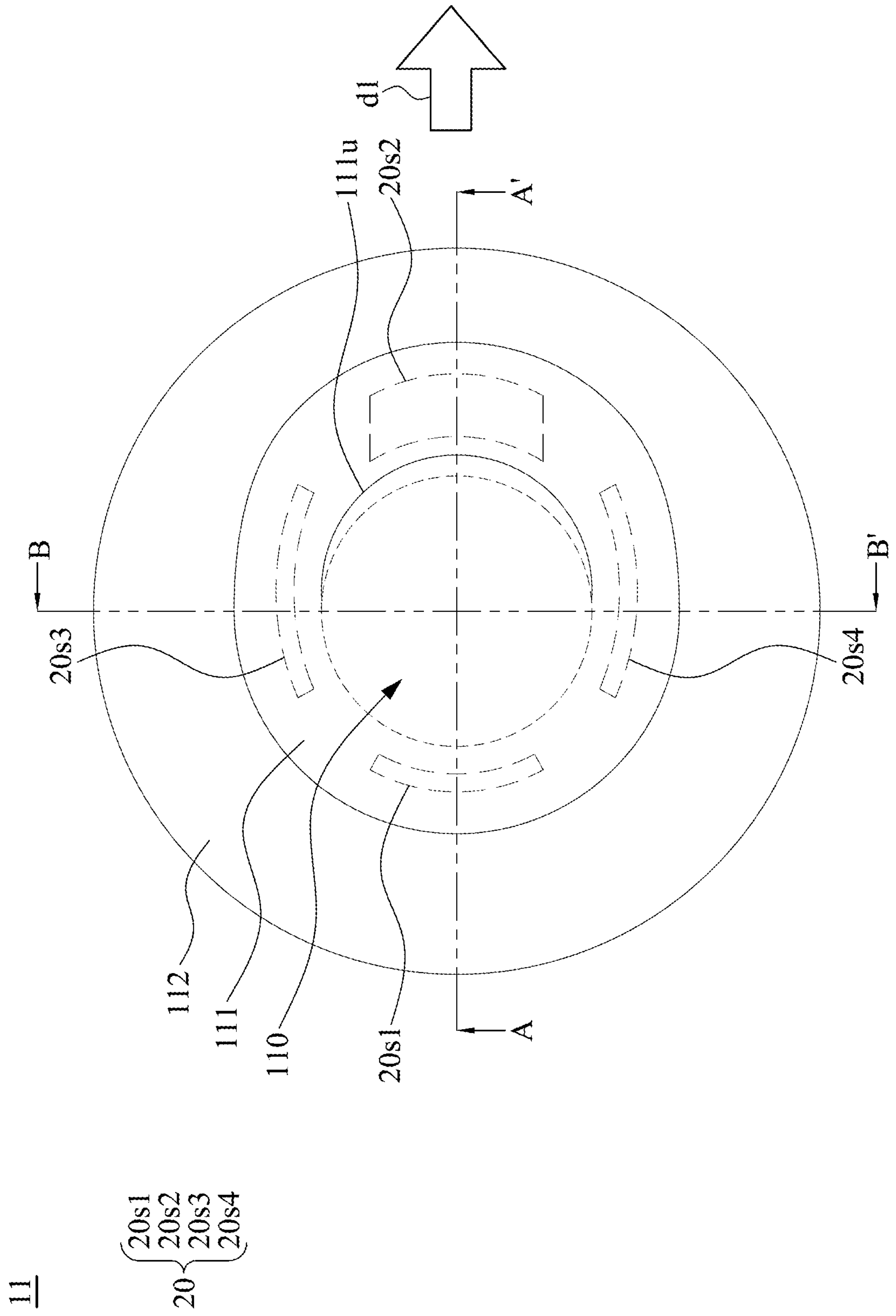
FIG. 3D illustrates a top view of an electronic device in accordance with some arrangements of the present disclosure.

FIG. 3C and FIG. 3D illustrate a cross-sectional view and a top view of an electronic device in accordance with some arrangements of the present disclosure. The ear tip 11 in FIG. 3C and FIG. 3D may be a configuration of the ear tip 11 in FIG. 2A and FIG. 3A after the deformable element 20 is deformed along a direction d1 and causes (or affects) the body portion 111 to deform the cover 110.

In a comparative embodiment, in order to improve the acoustic performance of the electronic device, the characteristics or properties (such as types, thicknesses, number of layers, materials, sizes, shapes, etc.) of the cover may be adjusted and determined when the electronic device is produced. The cover cannot be adjusted after the electronic device is manufactured.

However, acoustic performance may not be optimal to users due to other factors, such as differences in ear shapes and sizes, the sound volumes, the audio files, the surrounding environment, etc.

By providing the deformable element 20 in the body portion 111 to allow automatic deformation or manual deformation of the body portion 111 and/or the cover 110, the acoustic transparency, the acoustic resistance (or acoustic impedance), the acoustic damping, and/or the filtering effect of the acoustic signals (or sound waves) can be adjusted and modified after the electronic device is manufactured. Therefore, the desired acoustic performance can be achieved and the user experience can be enhanced.

For example, the size and shape of the acoustic channel 111*c* is important to the overall acoustic performance of the electronic device 1. Since the body portion 111 may be adjustable, the body portion 111 may be deformed due to the deformation of the deformable element 20, and thus the deformable element 20 may be configured to adjust and modify the acoustic performance of the electronic device 1. For example, the acoustic channel 111*c* can be dimensioned to tune a frequency response of the electronic device 1 by deforming the deformable element 20.

For example, the size and/or shape of the cover 110 (and the size and/or shape of the plurality of openings 110*h*) may adjust, affect, and/or define the acoustic transparency, the acoustic resistance (or acoustic impedance), the acoustic damping, and/or the filtering effect of the acoustic signals (or sound waves) passing through (or transmitted through) the cover 110. Since the size and/or the shape of the cover 110 may change along the body portion 111, the deformable element 20 may be configured to adjust and modify the acoustic performance of the electronic device 1. For example, by deforming the deformable element 20, the cover 110 and the plurality of openings 110*h* thereof may be deformed or adjusted, and the transmission of the acoustic signals (or sound waves) and air waves through the plurality of openings 110*h* of the cover 110 may be controlled to achieve the desired acoustic performance. For example, at least two of the openings 110*h* have different sizes and/or different shapes to regulate ventilation.

In addition, since the acoustic performance can be enhanced without changing or replacing the parts and elements of the electronic device 1, alteration involved in change of the system design or device characteristics is facilitated.

The number of the sections of the deformable element 20 may be 2, 3, 4, 5, 6, 7, 8, or more. More sections of the deformable element 20 allow a more accurate control over the deformation of the body portion 111 and/or the cover 110. For example, the body portion 111 may be expanded or contracted along different directions. For example, the body portion 111 may be expanded or contracted along multiple directions. For example, the cover 110 may be expanded or contracted along different directions. For example, the cover 110 may be expanded or contracted along multiple directions.

Figure 4A:
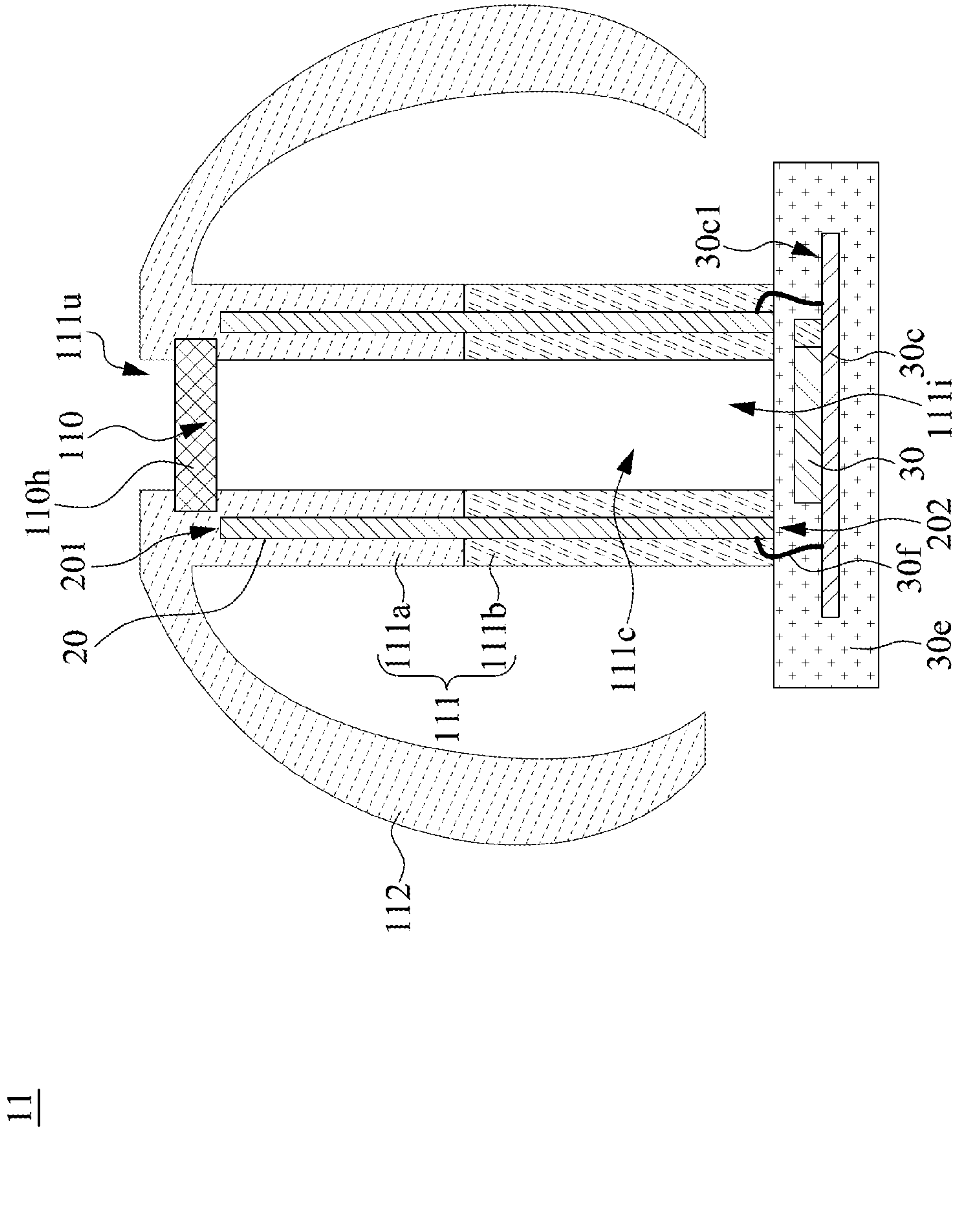
FIG. 4A illustrates a cross-sectional view of an electronic device in accordance with some arrangements of the present disclosure.

FIG. 4A illustrates a cross-sectional view of an electronic device in accordance with some arrangements of the present disclosure. The ear tip 11 in FIG. 4A is similar to the ear tip 11 in FIG. 3A except that the body portion 111 includes a portion (or a part) 111*a* connected with the ear interface portion 112 and a portion (or a part) 111*b* connected with the portion 111*a*.

The portion 111*a* may be connected between the ear interface portion 112 and the portion 111*b*. The portion 111*a* and the ear interface portion 112 may include the same material. The portion 111*a* and the ear interface portion 112 may be a single, monolithic structure. The portion 111*a* and the ear interface portion 112 may share the same characteristic or property. For example, the portion 111*a* and the ear interface portion 112 may have substantially the same elasticity, ductility, and/or malleability.

The portion 111*b* may have a characteristic or property different from that of the portion 111*a*. For example, the portion 111*a* may be softer than the portion 111*b*. The elasticity of the portion 111*a* may be greater than that of the portion 111*b*. The ductility of the portion 111*a* may be greater than that of the portion 111*b*. The malleability of the portion 111*a* may be greater than that of the portion 111*b*.

For example, the portion 111*b* may be harder than the portion 111*a*. The hardness of the portion 111*b* may be greater than that of the portion 111*a*. The portion 111*b* may include rubber, such as thermoset rubber or hard rubber, or other hard materials. In some arrangements, the portion 111*b* may be or include, silicon (Si), glass or other suitable materials. The portion 111*a* and the portion 111*b* may be formed using a two-shot molding process, such as two-shot injection process.

The portion 111*b* may restrict or limit the deformation of the deformable element 20. For example, the end 201 of the deformable element 20 may be a relatively free end (or an end that can be deformed more easily) and the end 202 of the deformable element 20 may be a relatively fixed end (or an end that is harder to be deformed). Therefore, the end 201 of the deformable element 20 may be deformed to allow a more accurate control over the deformation of the body portion 111 and/or the cover 110 while the end 202 of the deformable element 20 is substantially fixed. In some arrangements, the degree of deformation of the portion 111*a* may be greater than the degree of deformation of the portion 111*b*. The size and/or the shape of the cover 110 may change mainly along the portion 111*a*.

Figure 4B:
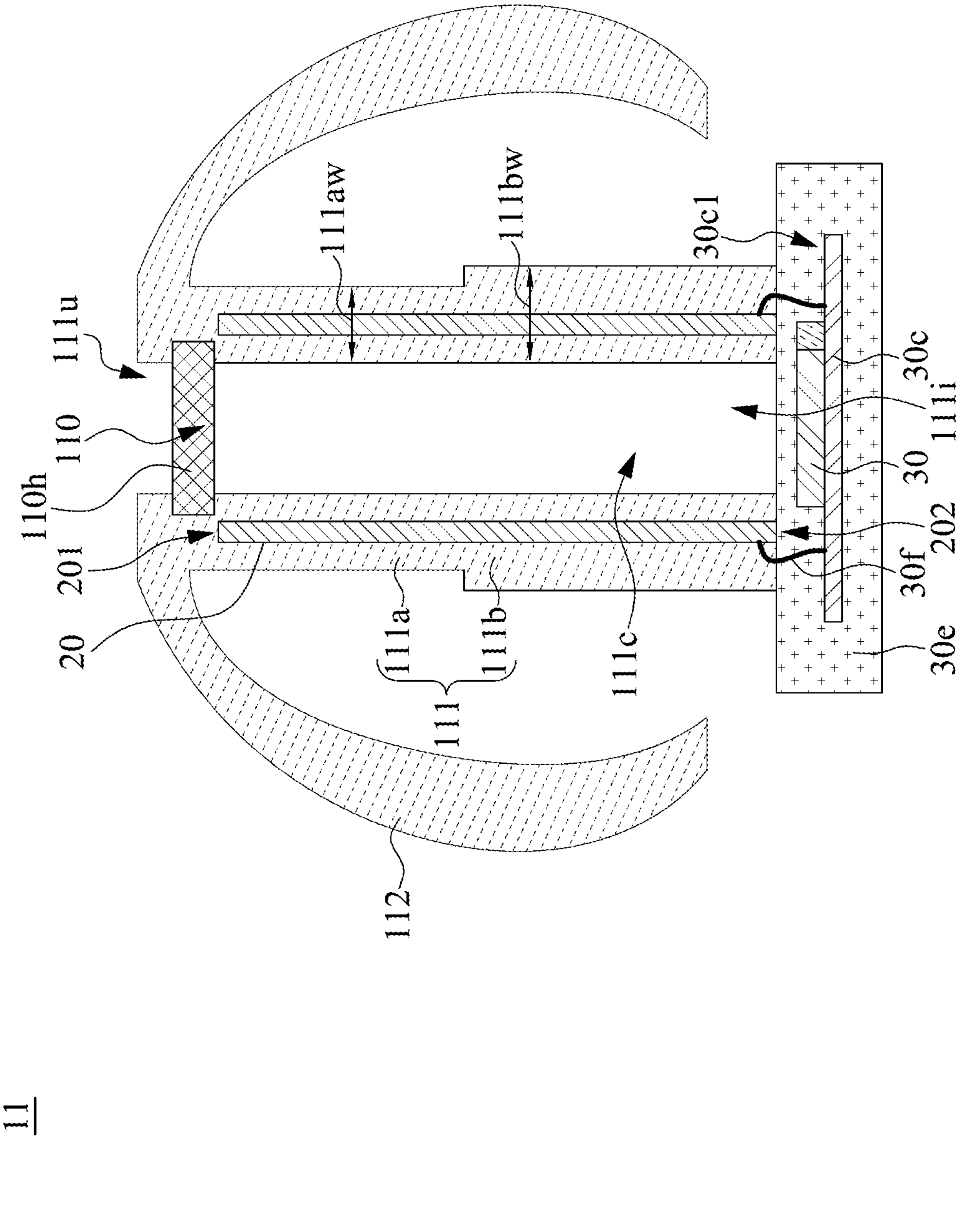
FIG. 4B illustrates a cross-sectional view of an electronic device in accordance with some arrangements of the present disclosure.

FIG. 4B illustrates a cross-sectional view of an electronic device in accordance with some arrangements of the present disclosure. The ear tip 11 in FIG. 4B is similar to the ear tip 11 in FIG. 4A except that a width 111*bw* of the portion 111*b* is greater than a width 111*aw* of the portion 111*a*. The portion 111*a* and the portion 111*b* may include the same material. In some arrangements, the portion 111*a* and the portion 111*b* may include different materials, as shown in FIG. 4A.

Similar to FIG. 4A, the portion 111*b* having a greater width may restrict or limit the deformation of the deformable element 20. Therefore, the end 201 of the deformable element 20 may be deformed to allow a more accurate control over the deformation of the body portion 111 and/or the cover 110 while the end 202 of the deformable element 20 is substantially fixed. In some arrangements, the degree of deformation of the portion 111*a* may be greater than the degree of deformation of the portion 111*b*. The size and/or the shape of the cover 110 may change mainly along the portion 111*a*.

Figure 4C:
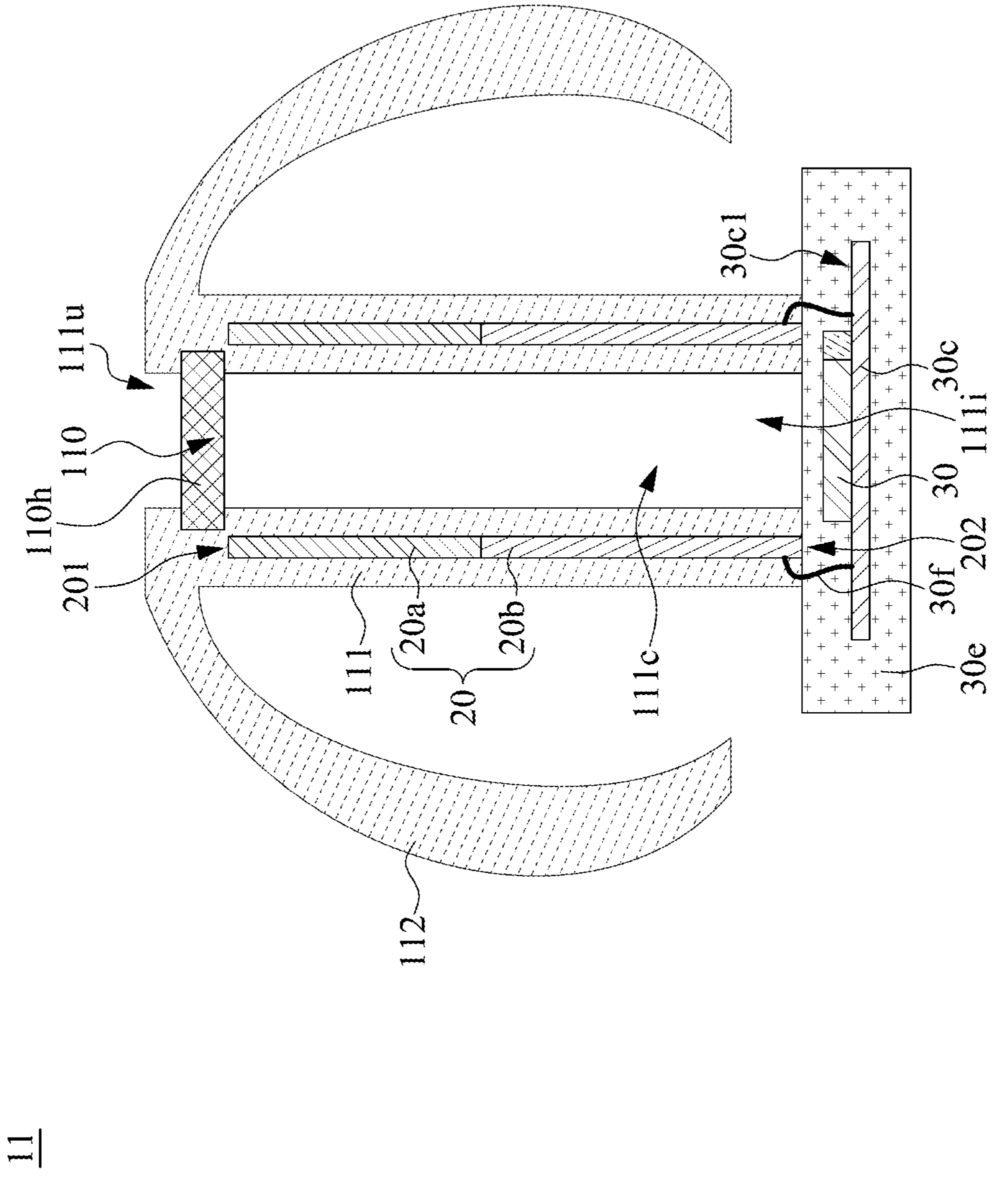
FIG. 4C illustrates a cross-sectional view of an electronic device in accordance with some arrangements of the present disclosure.

FIG. 4C illustrates a cross-sectional view of an electronic device in accordance with some arrangements of the present disclosure. The ear tip 11 in FIG. 4C is similar to the ear tip 11 in FIG. 3A except that the deformable element 20 includes a portion 20*a* and a portion 20*b* connected with the portion 20*a*. The portion 20*a* is disposed closer to the cover 110 than the portion 20*b* is.

The portion 20*b* may have a characteristic or property different from that of the portion 20*a*. For example, the portion 20*a* may be softer than the portion 20*b*. The elasticity of the portion 20*a* may be greater than that of the portion 20*b*. The ductility of the portion 20*a* may be greater than that of the portion 20*b*. The malleability of the portion 20*a* may be greater than that of the portion 20*b*.

For example, the portion 20*b* may be harder than the portion 20*a*. The hardness of the portion 20*b* may be greater than that of the portion 20*a*. The portion 20*a* and the portion 20*b* of the deformable element 20 may each include a piezoelectric material, which may be crystalline, ceramic, or polymeric. In some arrangements, the degree of deformation of the portion 20*a* may be greater than the degree of deformation of the portion 20*b*. The reaction of the portion 20*a* may be greater than the reaction of the portion 20*b* with respect to the voltage applied across the deformable element 20.

The end 201 of the deformable element 20 may be a relatively free end (or an end that can be deformed more easily) and the end 202 of the deformable element 20 may be a relatively fixed end (or an end that is harder to be deformed). Therefore, the end 201 of the deformable element 20 may be deformed to allow a more accurate control over the deformation of the body portion 111 and/or the cover 110 while the end 202 of the deformable element 20 is substantially fixed.

Figure 4D:
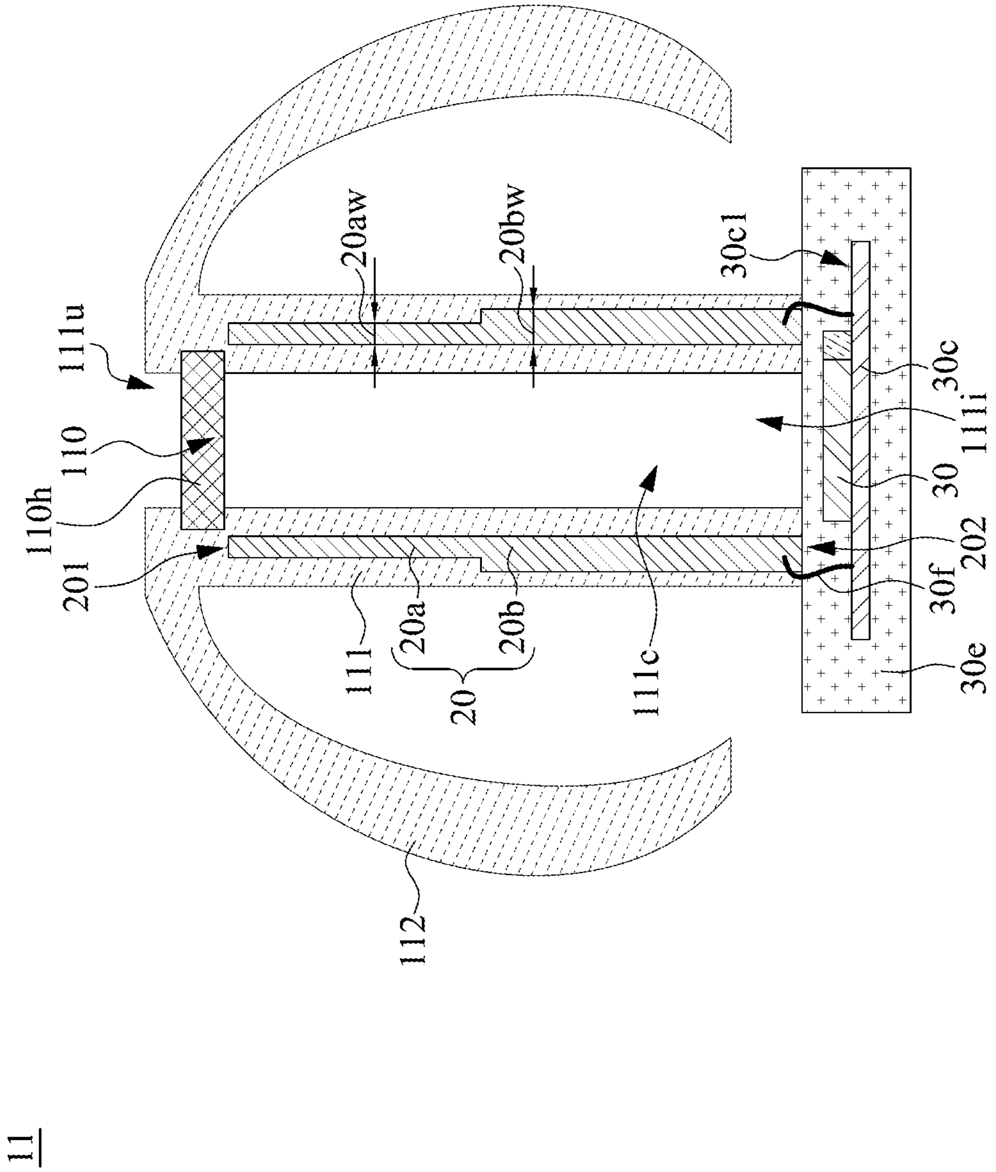
FIG. 4D illustrates a cross-sectional view of an electronic device in accordance with some arrangements of the present disclosure.

FIG. 4D illustrates a cross-sectional view of an electronic device in accordance with some arrangements of the present disclosure. The ear tip 11 in FIG. 4D is similar to the ear tip 11 in FIG. 4C except that a width 20*bw* of the portion 20*b* is greater than a width 20*aw* of the portion 20*a*. The portion 20*a* and the portion 20*b* may include the same material. In some arrangements, the portion 20*a* and the portion 20*b* may include different materials, as shown in FIG. 4C.

Similar to FIG. 4C, the end 201 of the deformable element 20 may be a relatively free end since the width 20*aw* is less than the width 20*bw*. Therefore, the end 201 of the deformable element 20 may be deformed to allow a more accurate control over the deformation of the body portion 111 and/or the cover 110 while the end 202 of the deformable element 20 is substantially fixed. In some arrangements, as a result of the material selections and the width designs of the deformable element 20 and the ear tip 11, the overall shape and appearance of the eartip 11 can be maintained so that the eartip 11 can still be worn in a user's ear canal, while at the same time functioning to regulate ventilation and achieve the desired acoustic performance.

Figure 5A:
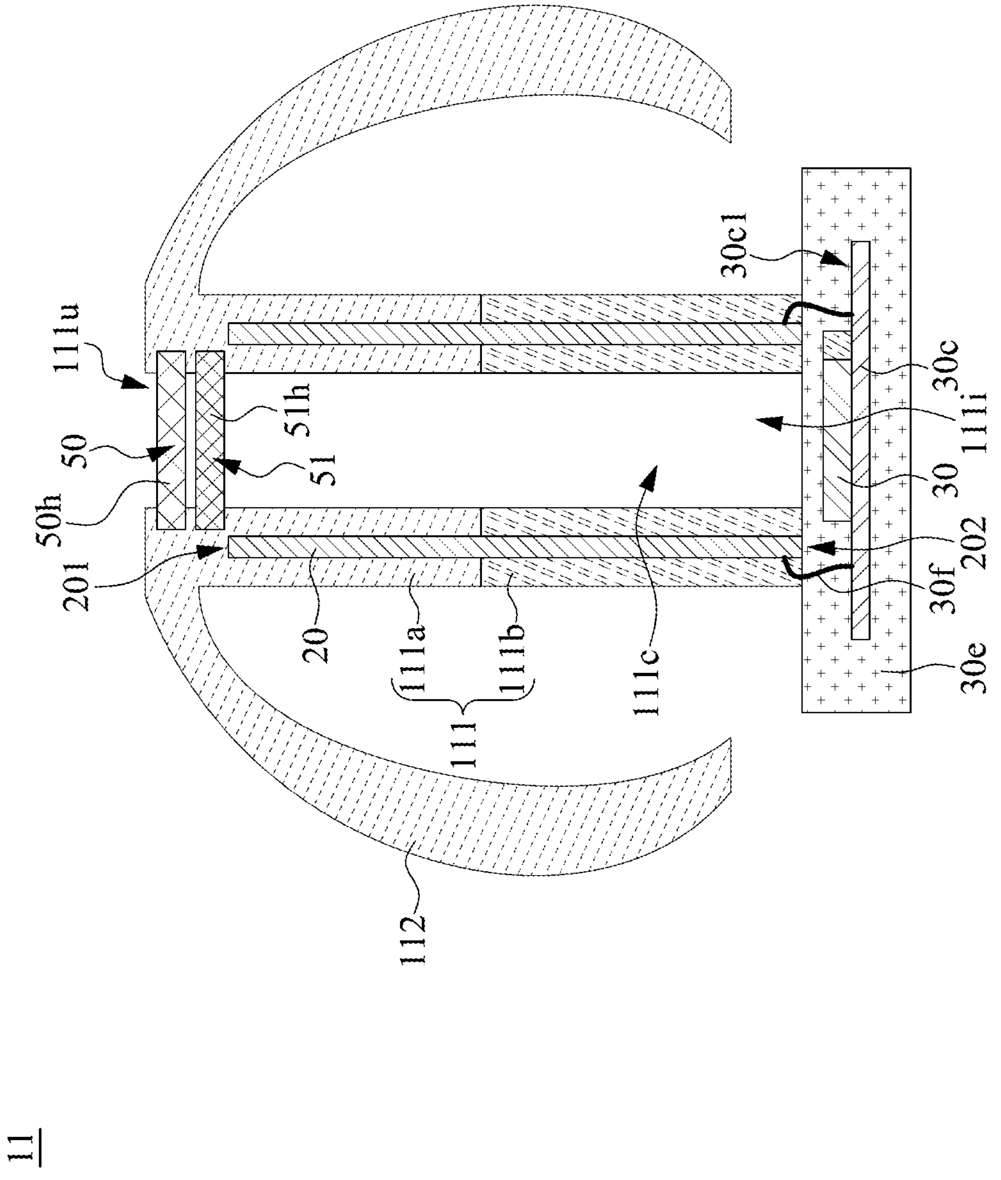
FIG. 5A illustrates a cross-sectional view of an electronic device in accordance with some arrangements of the present disclosure.

FIG. 5A illustrates a cross-sectional view of an electronic device in accordance with some arrangements of the present disclosure. The ear tip 11 in FIG. 5A is similar to the ear tip 11 in FIG. 4A except that the ear tip 11 in FIG. 5A includes two covers 50 and 51. The covers 50 and 51 are overlapped from a top view (as shown in FIG. 5G). In some arrangements, the cover 51 is disposed closer to the deformable element 20 than the cover 50, so the the degree of deformation of the cover 51 may be greater than the degree of deformation of the cover 50 when the deformable element 20 is deformed. In some arrangements, the size and/or the shape of the covers 50 and 51 may be different. In some arrangements, the size and/or the shape of the plurality of openings 50*h* and 51*h* of the covers 50 and 51 may be different.

In some arrangements, the deformation (such as changes in size and/or shape and the size and/or shape of the plurality of openings 50*h*) of the cover 50 and the deformation (such as changes in size and/or shape and the size and/or shape of the plurality of openings 51*h*) of the cover 51 may be separately controlled. For example, the cover 50 or the cover 51 can be separately deformed to provide a coarse adjustment of the acoustic transparency, the acoustic resistance (or acoustic impedance), the acoustic damping, and/or the filtering effect of the acoustic signals (or sound waves).

In some arrangements, the deformations of the covers 50 and 51) may together provide a fine adjustment.

Figure 5B:
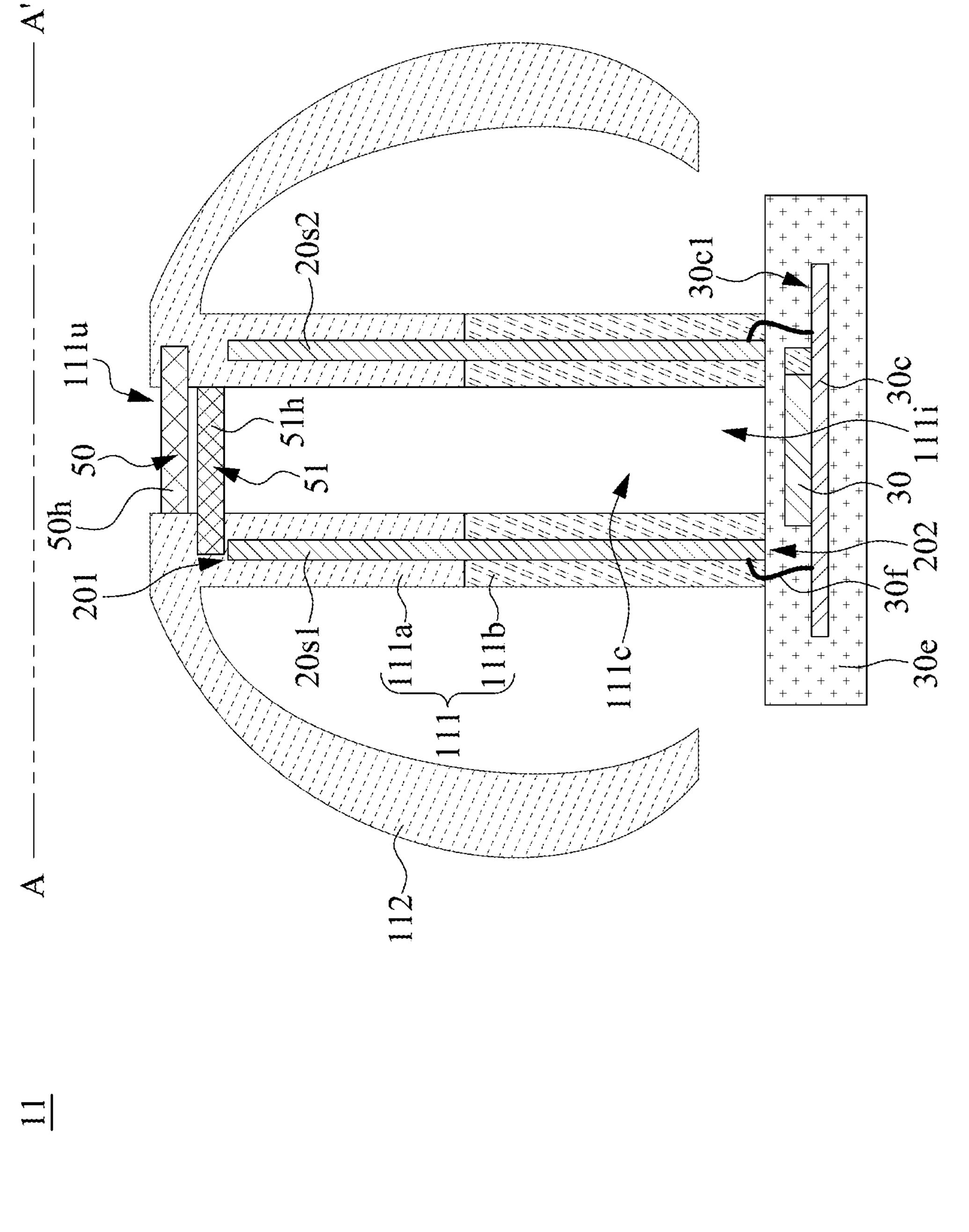
FIG. 5B illustrates a cross-sectional view of an electronic device in accordance with some arrangements of the present disclosure.

FIG. 5B illustrates a cross-sectional view of an electronic device in accordance with some arrangements of the present disclosure. The ear tip 11 in FIG. 5B is similar to the ear tip 11 in FIG. 5A except that the cover 50 is disposed closer to the section 20*s*2 of the deformable element (i.e., the deformable element 20 in FIG. 2A) than the cover 51 is, and that the cover 51 is disposed closer to the section 20*s*1 of the deformable element (i.e., the deformable element 20 in FIG. 2A) than the cover 50 is.

In some arrangements, the deformations of the covers 50 and 51 may be controlled by different sections of the deformable element (i.e., the deformable element 20 in FIG. 2A). For example, since the cover 50 is disposed closer to the section 20*s*2, the deformation of the cover 50 may be controlled by the section 20*s*2. For example, the section 20*s*1 is configured to adjust the deformation of the cover 51 along a first direction (such as the direction d2 in FIG. 5G). For example, the section 20*s*2 is configured to adjust the deformation of the cover 50 along a second direction (such as the direction d3 in FIG. 5G).

In some arrangements, the deformation impact from the section 20*s*2 on the cover 50 may be greater than the deformation impact from the section 20*s*1 on the cover 50. In some arrangements, the force (such as tensile force, thrust force, shear force, bending force or torsional force) from the section 20*s*2 on the cover 50 may be greater than the force from the section 20*s*1 on the cover 50.

In some arrangements, the degree of deformation of the cover 50 may be greater than the degree of deformation of the cover 51 when the section 20*s*2 is deformed. The reaction of the cover 50 may be greater than the reaction of the cover 51 due to the voltage applied across the section 20*s*2.

Figure 5C:
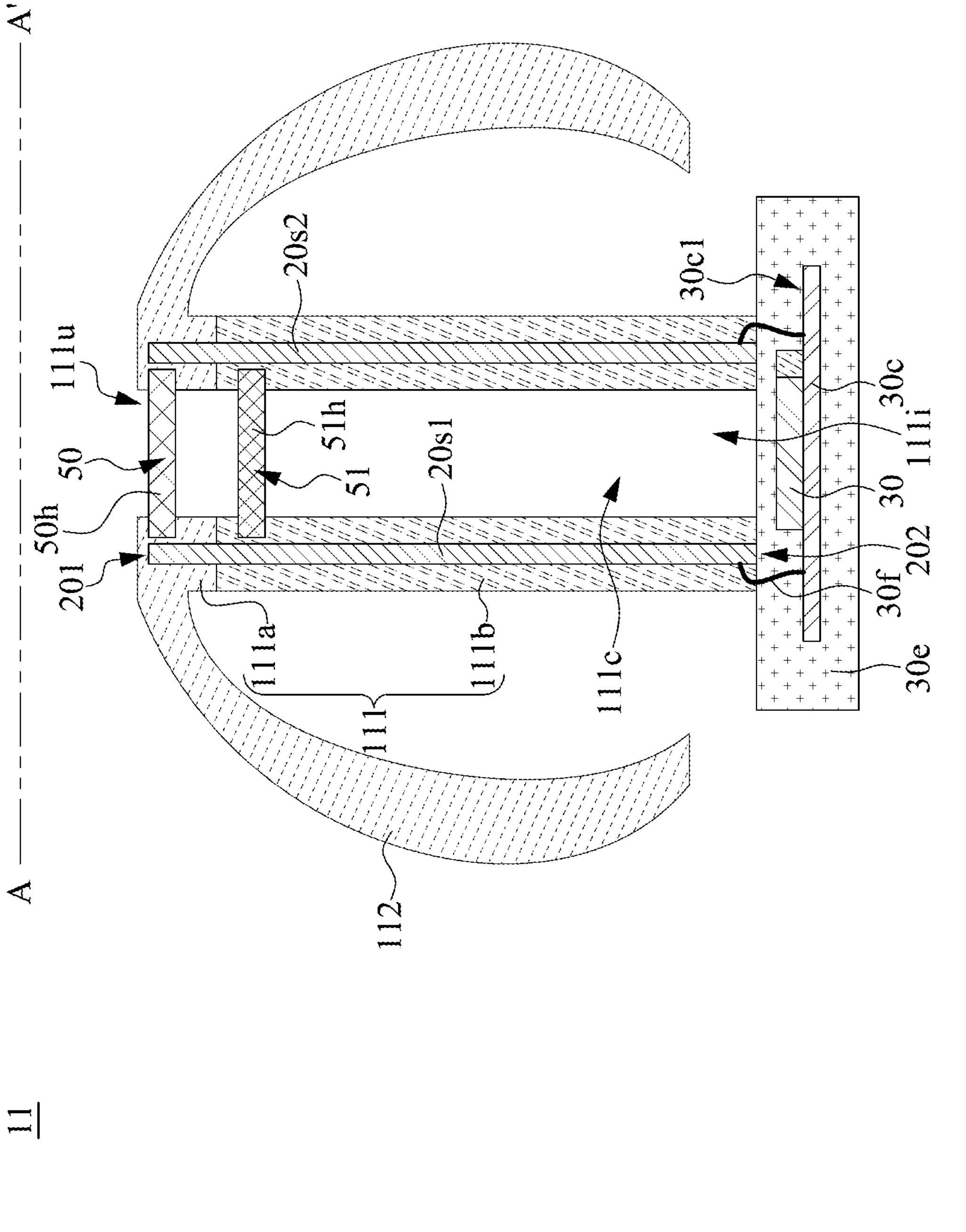
FIG. 5C illustrates a cross-sectional view of an electronic device in accordance with some arrangements of the present disclosure.
Figure 5D:
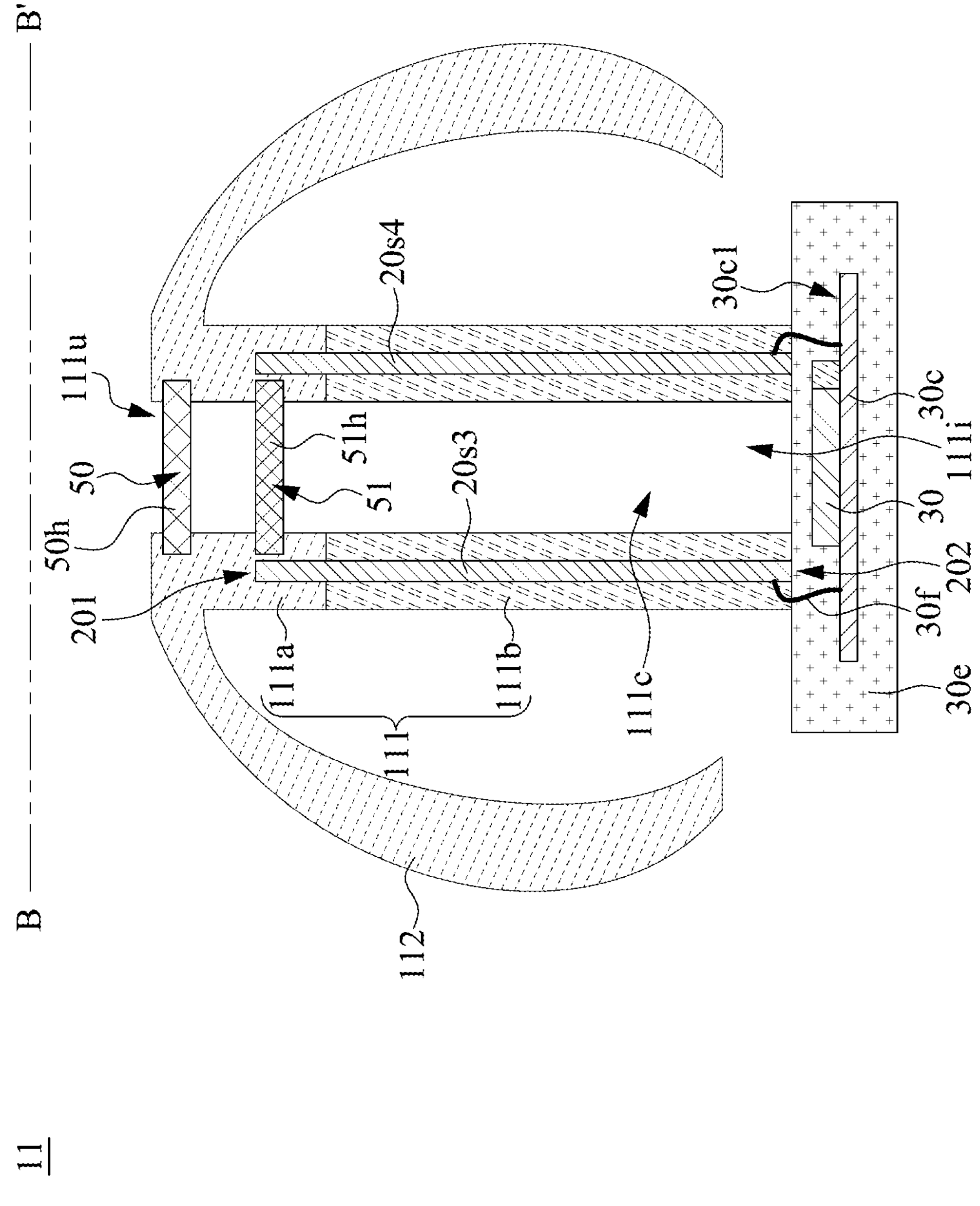
FIG. 5D illustrates a cross-sectional view of an electronic device in accordance with some arrangements of the present disclosure.

FIGS. 5C and 5D illustrate cross-sectional views of an electronic device in accordance with some arrangements of the present disclosure. The ear tips 11 in FIGS. 5C and 5D are similar to the ear tip 11 in FIG. 5A except for the differences described as follows. In some arrangements, the cross-sectional view in FIG. 5C may be a cross-sectional view of the ear tip 11 in FIG. 2A along the line AA' and the cross-sectional view in FIG. 5D may be a cross-sectional view of the ear tip 11 in FIG. 2A along the line BB'.

In FIG. 5C, the sections 20*s*1 and 20*s*2 may be configured to control the deformation of the cover 50. The sections 20*s*1 and 20*s*2 may be connected to the cover 50 through the portions 111*a* (which may be softer than the portion 111*b* as shown in FIG. 4A or may be narrower than the portion 111*b* as shown in FIG. 4B) of the body portion 111. The portions 111*a* of the body portion 111 may allow the deformation of the portions (e.g., the upper portions) of the sections 20*s*1 and 20*s*2 adjacent to the cover 50.

The sections 20*s*1 and 20*s*2 may be connected to the cover 51 through the portions 111*b* (which may be harder than the portion 111*a* as shown in FIG. 4A or may be wider than the portion 111*a* as shown in FIG. 4B) of the body portion 111. The portions 111*b* of the body portion 111 may restrict or limit the deformation of the portions (e.g., the lower portions) of the sections 20*s*1 and 20*s*2 adjacent to the cover 51. Therefore, the portions 111*b* of the body portion 111 may restrict or limit the deformation of the cover 51. For example, as shown in FIG. 5G, the cover 50 may be stretched or expanded from opposite directions and the cover 51 may remain substantially unchanged. However, in some arrangements, the portions 111*b* of the body portion 111 may be moved by the sections 20*s*1 and 20*s*2, except that the degree of the deformation of the portion 111*b* is less than the degree of the deformation of the portion 111*a*. Therefore, the degree of the deformation of cover 51 is less than the degree of the deformation of cover 50.

In FIG. 5D, the sections 20*s*3 and 20*s*4 may be configured to control the deformation of the cover 51.

The sections 20*s*3 and 20*s*4 may be connected to the cover 51 through the portions 111*a* (which may be softer than the portion 111*b* as shown in FIG. 4A or may be narrower than the portion 111*b* as shown in FIG. 4B) of the body portion 111. The portions 111*a* of the body portion 111 may allow the deformation of the portions of the sections 20*s*3 and 20*s*4 adjacent to the cover 51. The portions 111*b* of the body portion 111 may be lower than the cover 51 and may not be connected to the cover 51.

The sections 20*s*3 and 20*s*4 may not extend to be adjacent to the cover 50 to reduce the deformation impact from the sections 20*s*3 and 20*s*4 on the cover 50. Therefore, the degree of the deformation of cover 50 is less than the degree of the deformation of cover 51.

Figure 5E:
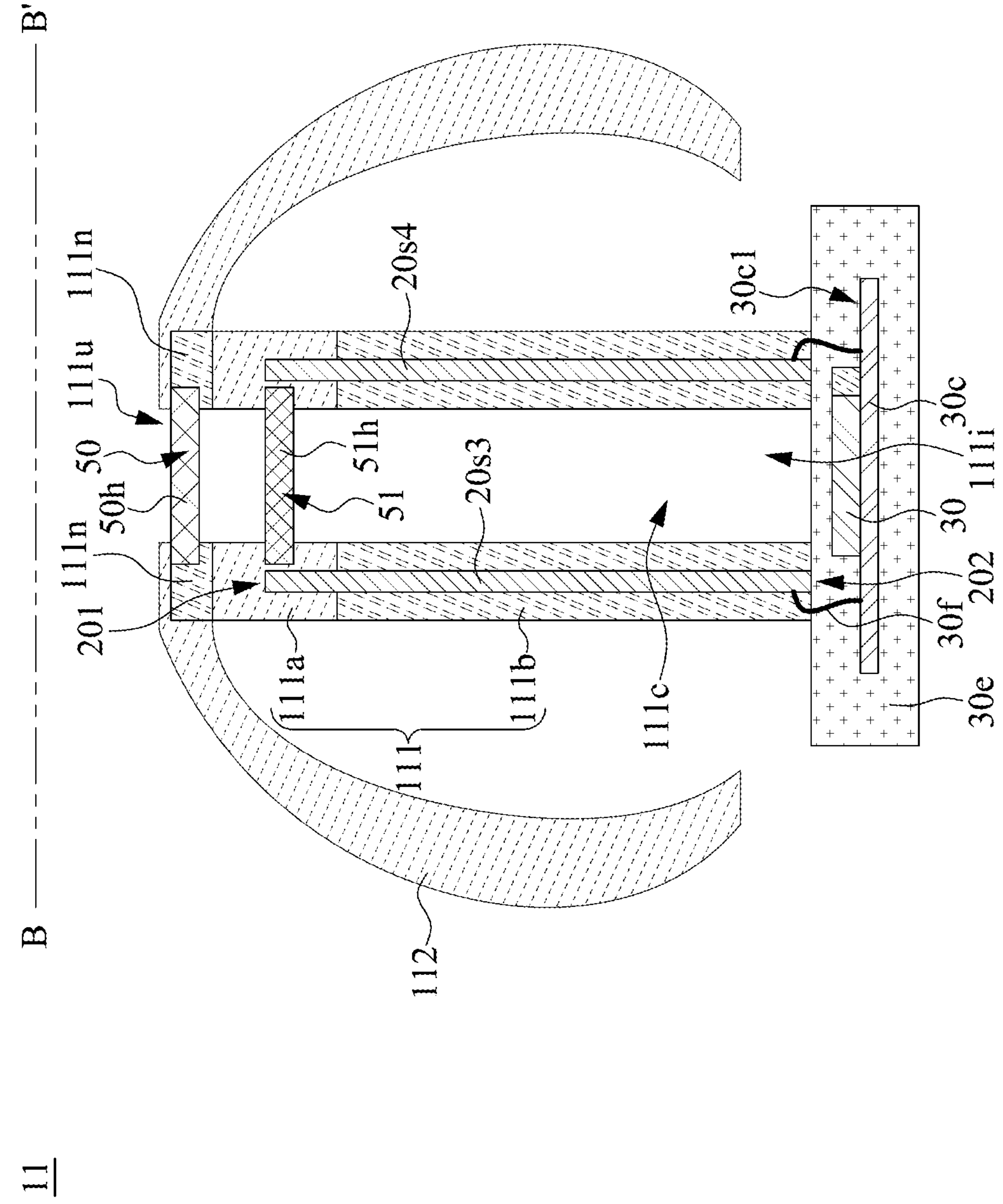
FIG. 5E illustrates a cross-sectional view of an electronic device in accordance with some arrangements of the present disclosure.

FIG. 5E illustrates a cross-sectional view of an electronic device in accordance with some arrangements of the present disclosure. The ear tip 11 in FIG. 5E is similar to the ear tip 11 in FIG. 5D except that the body portion 111 further includes portions 111*n* connected to the cover 50 to restrict or limit the deformation of the cover 50. The portion 111*n* and the portion 111*b* may include the same material. The portions 111*a* of the body portion 111 may allow the deformation of the portions of the sections 20*s*3 and 20*s*4 adjacent to the cover 51. Therefore, the degree of the deformation of cover 51 is higher than the degree of the deformation of cover 50.

Figure 5F:
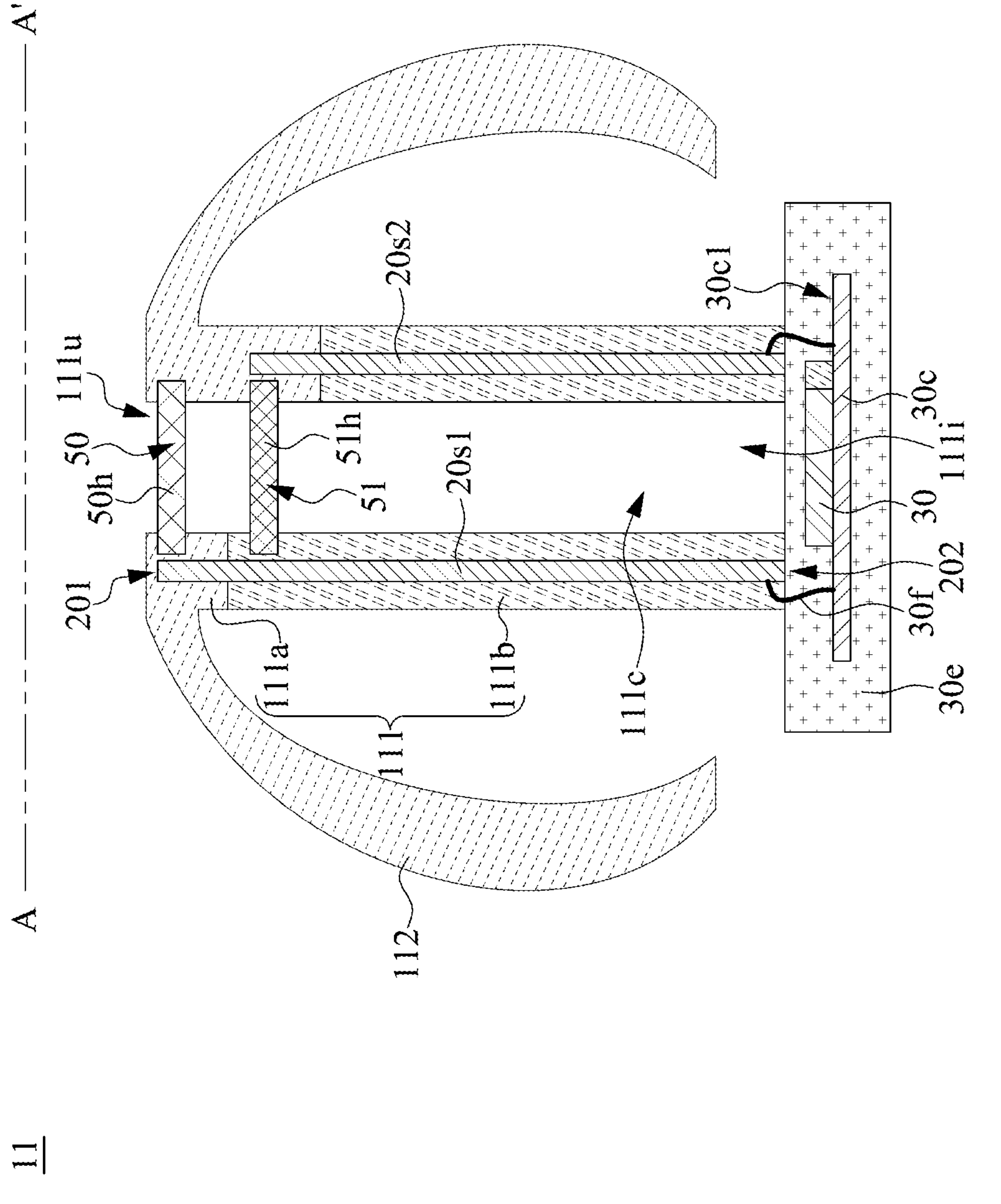
FIG. 5F illustrates a cross-sectional view of an electronic device in accordance with some arrangements of the present disclosure.
Figure 5G:
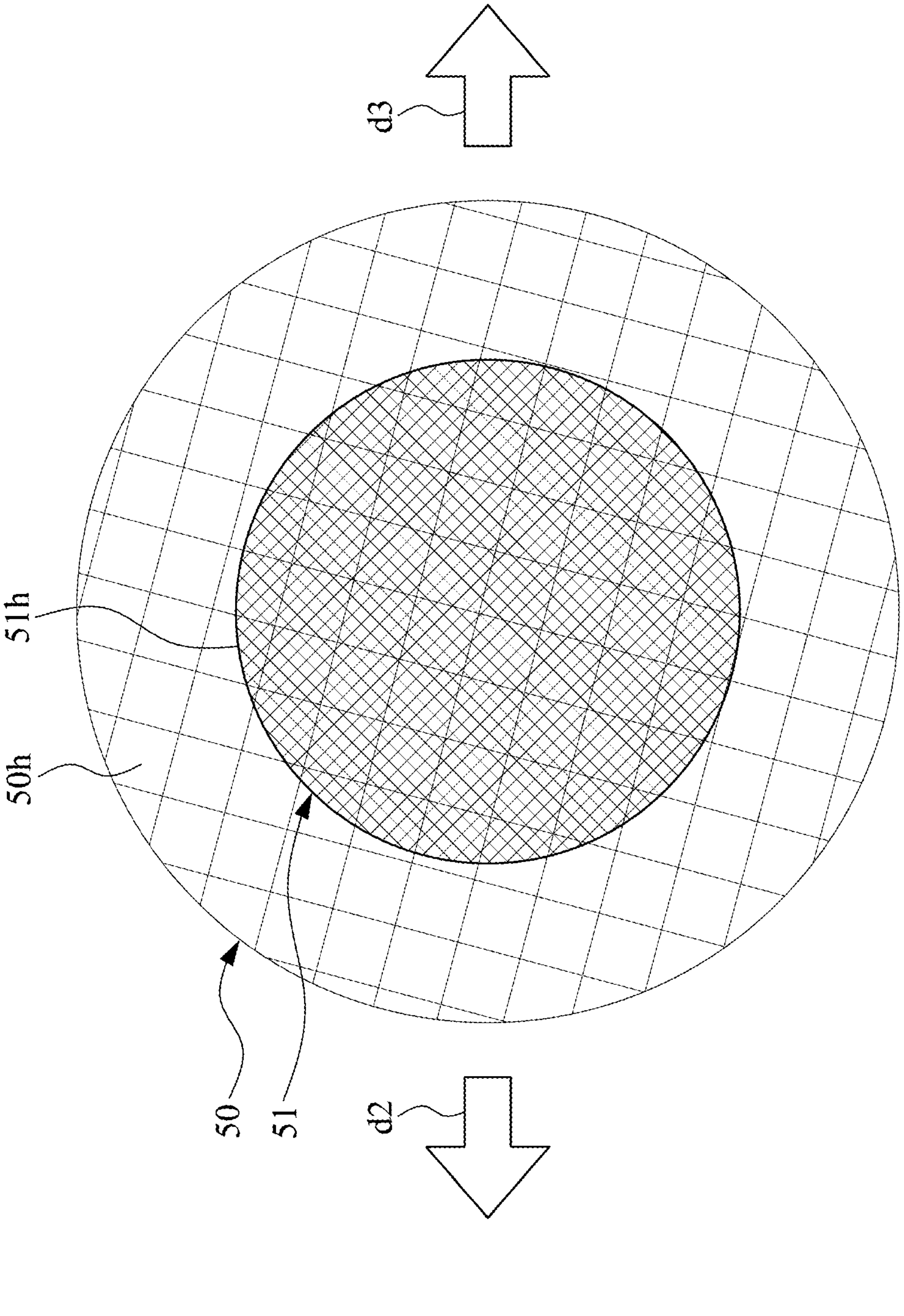
FIG. 5G illustrates a top view of an electronic device in accordance with some arrangements of the present disclosure.

FIG. 5F illustrates a cross-sectional view of an electronic device in accordance with some arrangements of the present disclosure. The ear tip 11 in FIG. 5F is similar to the ear tip 11 in FIG. 5C except that the section 20*s*1 may be configured to control the deformation of the cover 50 and the section 20*s*2 may be configured to control the deformation of the cover 51.

Additionally or alternatively, the section 20*s*3 may be configured to control the deformation of the cover 50 and the section 20*s*4 may be configured to control the deformation of the cover 51. To expand or contract the cover 50 and the cover 51 along multiple different directions independently, there may be more sections of the deformable element 20 to allow a more accurate control over the deformation of the cover 50 and the cover 51.

FIG. 6 illustrates a side view of the electronic device 1 being worn on an ear in accordance with some arrangements of the present disclosure.

The ear interface portion 112 may seal against a user's ear canal when the electronic device 1 is worn by the user, the deformable element 20 is deformed (e.g., exhibits a change in the size and/or the shape), and the size and/or the shape of the body portion 111 follows the size and/or the shape of the deformable element 20. Since a space is predefined between the ear interface portion 112 and the body portion 111, the body portion 111 and/or the cover 110 can be deformed while the ear interface portion 112 is comfortably in place.

Figure 7:
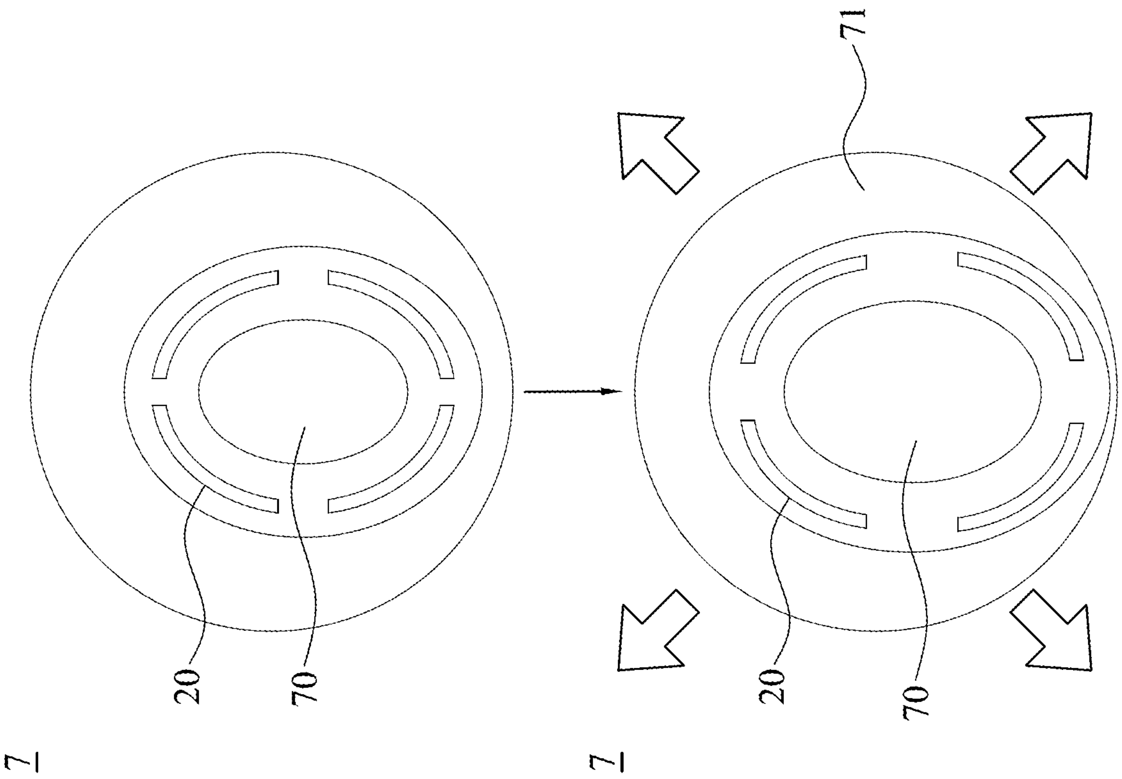
FIG. 7 illustrates top views of an electronic device before and after a cover thereof is adjusted in accordance with some arrangements of the present disclosure.

FIG. 7 illustrates top views of an electronic device 7 before and after a cover 70 thereof is adjusted in accordance with some arrangements of the present disclosure. The electronic device 7 may include a headset or a headphone. The cover 70 may have the same or similar configuration as the cover 110, and the same or similar details of the cover 70 are not repeated here for conciseness. The electronic device 7 may have a flexible portion 71, which may have the same or similar configuration as the ear interface portion 112. The deformable element 20 may be configured to adjust and modify the acoustic performance of the electronic device 7. For example, by deforming the deformable element 20, the cover 70 thereof may be deformed or adjusted, and the transmission of the acoustic signals (or sound waves) and air waves through the plurality of openings of the cover 70 may be controlled to achieve the desired acoustic performance. For example, at least two of the openings of the cover 70 have different sizes and/or different shapes.

As used herein, the singular terms "a," "an," and "the" may include a plurality of referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1, less than or equal to ±0.5°, less than or equal to ±0.10, or less than or equal to ±0.05°.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific arrangement thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other arrangement of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An electronic device, comprising:

an eartip including a body portion and an ear interface portion, wherein the body portion defines an acoustic channel having an acoustic output portion and an acoustic input portion opposite to the acoustic output portion, and the ear interface portion extends from the acoustic output portion;

a first cover disposed adjacent to the acoustic output portion and covering the acoustic channel, wherein the first cover is configured to separate the acoustic channel from an ear canal of a user when the electronic device is worn by the user; and a transducing element embedded in the body portion and configured to deform under an electric field, and in turn control a shape of the first cover.

2. The electronic device of claim 1, wherein the first cover includes a plurality of apertures, and the transducing element extends from an elevation of the acoustic input portion to an elevation adjacent to the first cover.

3. The electronic device of claim 2, wherein the transducing element includes an annular structure surrounding the acoustic channel.

4. The electronic device of claim 2, wherein the transducing element includes a plurality of sections symmetrically disposed with respect to a center of the first cover.

5. The electronic device of claim 4, further comprising:

a second cover disposed between the acoustic channel and the first cover, wherein the first cover extends over a free end of a first section of the plurality of sections, and the second cover extends over a free end of a second section of the plurality of sections.

6. The electronic device of claim 4, further comprising:

a second cover disposed between the acoustic channel and first cover, wherein the plurality of sections extends across a side of the first cover and a side of the second cover.

7. The electronic device of claim 6, wherein the body portion has a relatively harder potion and a relatively softer portion, the second cover is connected to the relatively harder portion, and the first cover is connected to the relatively softer portion.

8. The electronic device of claim 4, further comprising:

a second cover disposed between the acoustic channel and the first cover, wherein the body portion has a relatively harder portion and a relatively softer portion, a first side of the second cover is connected to the relatively harder portion, and a second side of the second cover is connected to the relatively softer portion.

9. The electronic device of claim 1, further comprising:

a housing partially received in the body portion from the acoustic input portion; and an electronic component disposed in the housing and configured to provide the electric field.

10. The electronic device of claim 9, further comprising:

a carrier electrically connecting the electronic component; and a flexible connection element electrically connecting between the carrier and the transducing element.

11. An electronic device, comprising:

an eartip including a body portion and an ear interface portion, wherein the body portion defines an acoustic channel having an acoustic output portion and an acoustic input portion opposite to the acoustic output portion, and the ear interface portion extends from the acoustic output portion;

an acoustically transmissive cover covering the acoustic channel, wherein the acoustically transmissive cover includes a plurality of apertures; and a transducing element embedded in the body portion and configured to deform under an electric field, and in turn adjust dimensions of the plurality of apertures.

12. The electronic device of claim 11, further comprising:

a housing partially received in the body portion from the acoustic input portion; and an electronic component disposed in the housing and configured to provide the electric field.

13. The electronic device of claim 12, wherein the electronic component is configured to determine a frequency response in a user'ear canal when the electronic device is worn and to use the frequency response to determine whether a desired acoustic performance has been achieved.

14. The electronic device of claim 12, wherein the transducing element has a fixed end connecting the housing and a free end disposed in adjacent to the acoustically transmissive cover.

15. The electronic device of claim 14, wherein the transducing element includes an annular structure surrounding the acoustic channel.

16. An electronic device, comprising:

an eartip including a body portion and an ear interface portion, wherein the body portion defines an acoustic channel having an acoustic output portion and an acoustic input portion opposite to the acoustic output portion, and the ear interface portion extends from the acoustic output portion; and a transducing element embedded in the body portion and configured to deform under an electric field, and in turn change a size, a shape, or both of the body portion to adjust an acoustic signal transmitted through the acoustic channel.

17. The electronic device of claim 16, wherein the transducing element comprises a plurality of sections symmetrically disposed with respect to a center of the acoustic channel, and the electronic device further comprising:

a controlling component configured to control at least one of the plurality of sections to deform.

18. The electronic device of claim 17, wherein the controlling component is configured to determine a frequency response in a user's ear canal when the electronic device is worn and to use the frequency response to determine whether a desired acoustic performance has been achieved.

19. The electronic device of claim 17, further comprising:

a first acoustically transmissive cover covering the acoustic channel, wherein a first section of the plurality of sections is configured to adjust a dimension of the first acoustically transmissive cover.

20. The electronic device of claim 19, further comprising:

a second acoustically transmissive cover covering the acoustic channel, wherein the first section is configured to adjust a deformation of the first acoustically transmissive cover in a first direction and a second section of the plurality of sections is configured to adjust a deformation of the second acoustically transmissive cover in a second direction.

* * * * *